(12) United States Patent
Uno et al.

(10) Patent No.: US 10,069,323 B2
(45) Date of Patent: Sep. 4, 2018

(54) CHARGE-DISCHARGE DEVICE WITH EQUALIZATION FUNCTION USING BOTH CONVERTOR AND MULTI-STAGE VOLTAGE DOUBLER RECTIFIER CIRCUIT

(71) Applicant: Japan Aerospace Exploration Agency, Tokyo (JP)

(72) Inventors: Masatoshi Uno, Hitachi (JP); Akio Kukita, Kamakura (JP)

(73) Assignee: Japan Aerospace Exploration Agency, Tokyo (JP)

( * ) Notice: Subject to any disclaimer, the term of this patent is extended or adjusted under 35 U.S.C. 154(b) by 39 days.

(21) Appl. No.: 14/892,860

(22) PCT Filed: May 27, 2014

(86) PCT No.: PCT/JP2014/063932
§ 371 (c)(1),
(2) Date: Nov. 20, 2015

(87) PCT Pub. No.: WO2014/192726
PCT Pub. Date: Dec. 4, 2014

(65) Prior Publication Data
US 2016/0118817 A1   Apr. 28, 2016

(30) Foreign Application Priority Data
May 28, 2013  (JP) .................................. 2013-112219

(51) Int. Cl.
*H02J 7/00* (2006.01)
*H01M 10/42* (2006.01)
(Continued)

(52) U.S. Cl.
CPC ............. *H02J 7/007* (2013.01); *H01M 10/42* (2013.01); *H01M 10/44* (2013.01);
(Continued)

(58) Field of Classification Search
CPC .... H02J 7/02; H02J 7/007; H02J 7/008; H02J 7/0014; H02J 7/0065; H01M 10/44; B60L 11/1866
(Continued)

(56) References Cited

U.S. PATENT DOCUMENTS

2009/0273321 A1* 11/2009 Gotzenberger ....... H02J 7/0018
320/166
2014/0117868 A1   5/2014 Lopez et al.

FOREIGN PATENT DOCUMENTS

JP   H11-032443 A   2/1999
JP   2011-045162 A   3/2011
(Continued)

OTHER PUBLICATIONS

International Search Report issued in Application No. PCT/JP2014/063932, dated Jul. 8, 2014.
(Continued)

*Primary Examiner* — Paul Dinh
(74) *Attorney, Agent, or Firm* — Studebaker & Brackett PC

(57) ABSTRACT

The disclosure describes a charge device capable of charging electricity storage cells while eliminating a voltage variation among the electricity storage cells without a need for at least a circuit section playing a role in voltage equalization among the electricity storage cells to be designed to have a large current capacity, and describes a charge-discharge device constructed by additionally equipping a discharging function with the charge device. Provided are a charge device and a charge-discharge device each of which comprises a convertor, an input circuit, and a multi-stage voltage doubler rectifier circuit. An element in the convertor configured to be applied with a rectangular waveform voltage is connected to the multi-stage voltage doubler rectifier circuit via the input circuit to thereby realize a voltage equalization function, and
(Continued)

an output section of the convertor is connected to the multi-stage voltage doubler rectifier circuit to thereby realize a charging-discharging function.

4 Claims, 38 Drawing Sheets

(51) Int. Cl.
*H02M 3/00* (2006.01)
*H02M 3/156* (2006.01)
*H02M 7/10* (2006.01)
*H02J 7/34* (2006.01)
*H01M 10/44* (2006.01)
*H02M 3/155* (2006.01)
*H02M 1/00* (2006.01)

(52) U.S. Cl.
CPC ............ *H02J 7/0019* (2013.01); *H02J 7/345* (2013.01); *H02M 3/005* (2013.01); *H02M 3/156* (2013.01); *H02M 7/103* (2013.01); *H01M 2010/4271* (2013.01); *H02J 7/0052* (2013.01); *H02J 2007/0059* (2013.01); *H02M 2001/007* (2013.01); *H02M 2001/009* (2013.01); *H02M 2001/0058* (2013.01); *H02M 2003/1557* (2013.01); *Y02B 40/90* (2013.01); *Y02B 70/1491* (2013.01)

(58) Field of Classification Search
USPC ........................................................ 320/166
See application file for complete search history.

(56) References Cited

FOREIGN PATENT DOCUMENTS

| | | |
|---|---|---|
| JP | 2011-199949 A | 10/2011 |
| JP | 2012-029436 A | 2/2012 |
| JP | 2012-090366 A | 5/2012 |
| JP | 2012-186881 A | 9/2012 |
| WO | 2012/172472 A1 | 12/2012 |

OTHER PUBLICATIONS

Written Opinion issued in Application No. PCT/JP2014/063932, dated Jul. 8, 2014.
Uno, M. et al., "Cell Voltage Equalizer Using Series Resonant Inverter and Voltage Multiplier for Series-Connected Supercapacitors", IEEE Energy Conversion Congress and Exposition, 2012, pp. 672-677.
CN Office Action dated May 3, 2017 from corresponding CN Appl No. 201480029896.4, 6 pp.
An Office Action dated by State Intellectual Property Office of the People's Republic of China on May 8, 2018, which corresponds to Chinese Patent Application No. 201480029896.4 and is related to U.S. Appl. No. 14/892,860; with brief English translation.
"The Main Circuit Configuration and Control Method of Sepic PWM DC/DC Converter", Source: Yang-sing electrics, Published: Oct. 8, 2008; with English translation.

\* cited by examiner

CHARGE-DISCHARGE DEVICE WITH EQUALIZATION FUNCTION USING BOTH CONVERTOR AND MULTI-STAGE VOLTAGE DOUBLER RECTIFIER CIRCUIT

TECHNICAL FIELD

The present invention relates to a charge-discharge device for charging and discharging an electricity storage module composed of a series-connection of a plurality of electricity storage cells (secondary batteries, electric double layer capacitors, etc.), while equalizing voltages of the electricity storage cells.

BACKGROUND ART

In order to obtain a desired voltage depending on the intended use, an electricity storage cell such as a secondary battery or an electric double layer capacitor is plurally provided, wherein the plurality of electricity storage cells are connected in series to form an storage module, and used. In the electricity storage module, along with repetitive charging and discharging, a variation in cell voltage occurs among the respective cells, due to variation in capacity, internal resistance, environmental temperature, self-discharge and the like. The variation occurring in the electricity storage module causes problems such as accelerated progression of degradation, and reduction in utilizable energy. Thus, in the case where a plurality of electricity storage cells are connected in series and used, there is a need for an equalization circuit designed to eliminate a voltage variation among the respective cells.

Heretofore, various types of equalization circuits have been employed. However, many of the types require a large number of switches, causing a problem of an increase in complexity of a circuit configuration. As measures against this problem, there have been proposed two types of equalization circuits capable of operating, respectively, using one transistor and two transistors (i.e., one switch and two switches) (see FIG. 1 and FIG. 2 corresponding, respectively, to the following Patent Document 1, and Japanese Patent Application No. 2012-46569 which is an earlier patent application filed by the same applicant as that of the present invention). These schemes make it possible to significantly reduce the number of required switches, and therefore have an advantage of being able to significantly simplify a circuit configuration. However, the schemes are directed to an "equalization circuit" specialized in voltage equalization, so that it is necessary to separately equip a charge-discharge device for charging and discharging the electricity storage cells. That is, in terms of an electricity storage system, it is necessary to equip a "charge-discharge device" in addition to an "equalization circuit". Thus, there still remains a need for simplification of the electricity storage system.

In this connection, there has been proposed an equalization function-equipped charger capable of operating using one transistor (i.e., one switch) (see FIG. 3 corresponding to the following Patent Document 2). This scheme is based on an integration of a charger and an equalization circuit, and is therefore capable of charging series-connected electricity storage cells while eliminating a voltage variation among the electricity storage cells. That is, there is no need to equip a charger and an equalization circuit in a separate manner, so that it becomes possible to promote simplification in terms of an electricity storage system. However, this scheme is configured to supply charging electric power to the series-connected electricity storage cells, individually. Thus, each of all components composing a circuit needs to be designed to have a relatively large current capacity, so that the circuit tends to be increased in size and cost. Moreover, it does not have any function of a discharge device. Thus, a discharge device is required separately.

CITATION LIST

Patent Document

Patent Document 1: JP 2012-186881A
Patent Document 2: JP 2011-199949A
Patent Document 3: JP 2011-45162A

Non-Patent Document

Non-Patent Document 1: M. Uno and A. Kukita, "Cell Voltage Equalizer Using Series Resonant Inverter and Voltage Multiplier for Series-Connected Supercapacitors", IEEE Energy Conversion Congress and Exposition, 2012, pp. 672-677.

SUMMARY OF INVENTION

Problem to be Solved by the Invention

The present invention has been made under the above circumstance. The problem to be solved by the present invention are: providing of a charge device capable of charging while eliminating a voltage variation among the electricity storage cells without a need for at least a circuit section serving a function of voltage equalization among the electricity storage cells to be designed to have a large current capacity; and providing of a charge-discharge device constructed by additionally equipping a discharging function with such the charger.

Means for Solving the Problem

In order to solve the problem, the present invention provides a charge device which comprises: a multi-stage voltage doubler rectifier circuit in which two series-connected diodes are connected in parallel, respectively, to each of series-connected 1st to nth capacitors (where n is an integer of 2 or more), and an intermediate capacitor is further connected, respectively, to each intermediate point of the two series-connected diodes; a converter comprising an element configured to be applied with a rectangular waveform voltage during operation; and an input circuit operable, in response to receiving an input of a voltage from the element, to output a voltage to the multi-stage voltage doubler rectifier circuit, wherein the charge device is configured such that the series-connected 1st to nth capacitors are connected to an output part of the converter to thereby charge the 1st to nth capacitors by an output voltage of the converter, and a voltage is input from the element into the multi-stage voltage doubler rectifier circuit via the input circuit to thereby equally charge the 1st to nth capacitors.

In a charging operation, the charge device charges the series-connected capacitors chain by the output voltage of the converter, while equalizing voltages across the series-connected capacitors chain by utilizing the rectangular waveform voltage applied to the element in the convertor. An electricity storage cell or a group of electricity storage cells may be connected to the series-connected capacitors chain so as to be charged, as mentioned in an aftermentioned embodiment.

Preferably, the input circuit comprises a first coil connected to the element, and a second coil magnetically coupled to the first coil and connected to the multi-stage voltage doubler rectifier circuit. The input circuit may be composed using a transformer in this manner. In this case, a current ratio between the first coil side and the second coil side can be adjusted, therefore allowing for increased flexibility in design. Particularly, in this embodiment, a series resonance circuit comprising an inductor and a capacitor connected in series is connected to the first coil. The use of the series resonance circuit makes it possible to control a magnitude of (electric) current to flow into the multi-stage voltage doubler rectifier circuit via the input circuit, as mentioned in an aftermentioned embodiment.

The converter used in the charge device of the present invention may be composed of a bidirectional converter. The use of the bidirectional converter makes it possible to perform charging and discharging of the 1st to nth capacitors, so that the charge device of the present invention becomes capable of operating as a charge-discharge device.

Effect of Invention

In the equalization function-equipped charge-discharge device of the present invention, an equalization function can be newly added by connecting the multi-stage voltage doubler rectifier circuit to a switching node in a charge-discharge device using a conventional converter. In a typical embodiment, charging and discharging of electricity storage cells are mainly performed by the converter, and the multi-stage voltage doubler rectifier circuit is operable to supply only small electric power for eliminating a voltage variation among the electricity storage cells. Thus, a charge-discharge circuit section (converter) and an equalization circuit section (multi-stage voltage doubler rectifier circuit) can be adequately designed separately, so that it becomes possible to reduce a size and cost of the circuit, as compared to the conventional schemes.

DESCRIPTION OF EMBODIMENTS

With reference to the drawings, a charge device and a charge-discharge device according to the present invention will now be described. It should be understood that configurations of the charge device and the charge-discharge device according to the present invention are not limited to specific embodied configurations illustrated in the respective drawings, but may be appropriately modified within the scope of the present invention. For example, in the following description, a capacitor will be described mainly as an independent electricity storage element, and an electricity storage cell will be described as a secondary battery, an electric double layer capacitor or the like. Alternatively, each of them may be any chargeable and dischargeable element, or a module composed of a plurality of such elements, or may be any device composed using the module. Further, although a multi-stage voltage doubler rectifier circuit in the following embodiments is described as a 4-stage voltage doubler rectifier circuit, the number of stages of the multi-stage voltage doubler rectifier circuit in the present invention, i.e., the number n of serial-connected capacitors, may be any integer of 2 or more.

A voltage equalization function-equipped charge device and charge-discharge device of the present invention comprises three functional sections: a converter (charging circuit); an input circuit; and a multi-stage voltage doubler rectifier circuit. As a representative example usable as the converter, FIGS. 4a to 4f illustrate, respectively, a step-down converter, a step-up converter, an inverting step-up and step-down converter, a SEPIC converter, a Zeta converter, and a Cuk converter. Respective capacitors comprised in the multi-stage voltage doubler rectifier circuit can be charged by an output voltage of those converters.

In FIGS. 4a to 4f, a rectangular waveform voltage generated at a switching node in the converter is also illustrated. Voltages across the respective capacitors comprised in the multi-stage voltage doubler rectifier circuit can be equalized by inputting the rectangular waveform voltage generated at those switching nodes, into the multi-stage voltage doubler rectifier circuit via the input circuit.

Figure 4A:
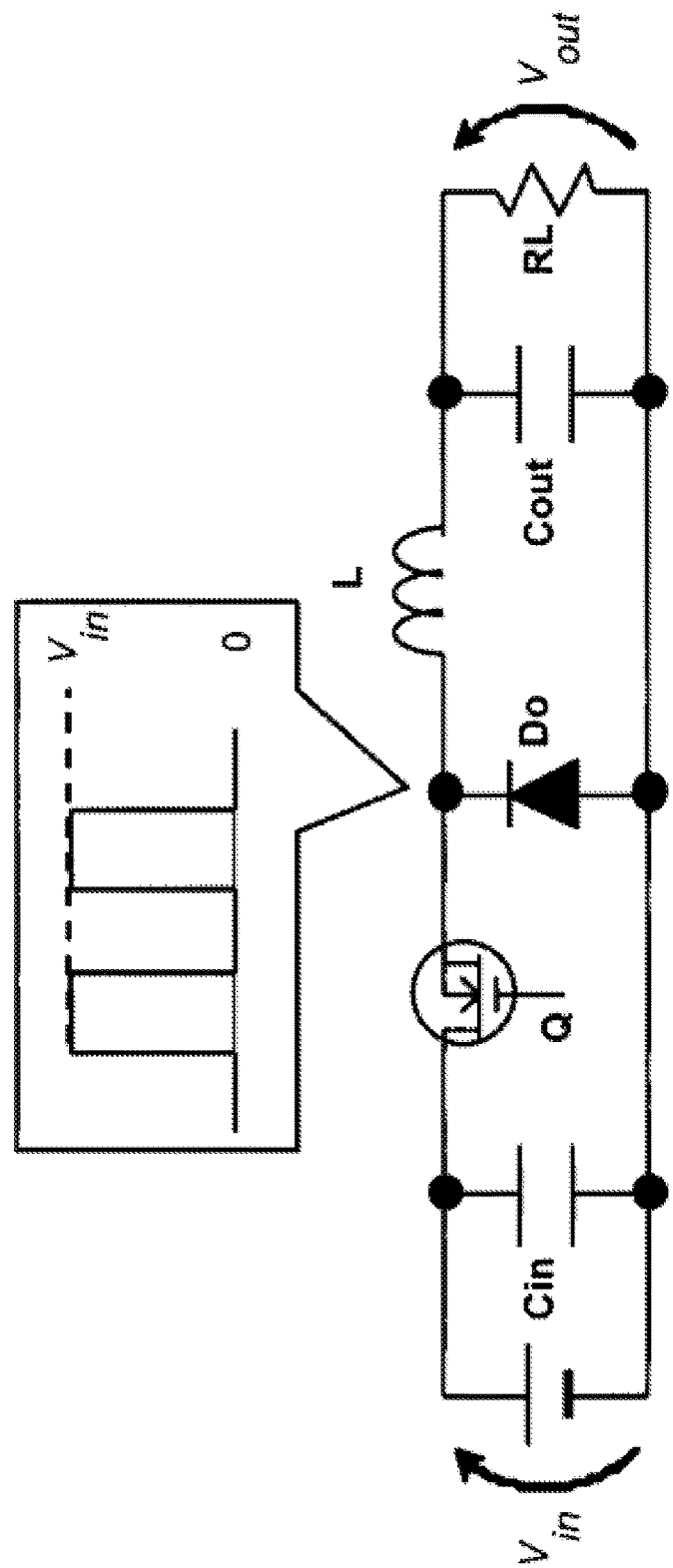
FIG. 4a is circuit diagram of a step-down converter usable in a charge device and a charge-discharge device of the present invention.
Figure 4B:
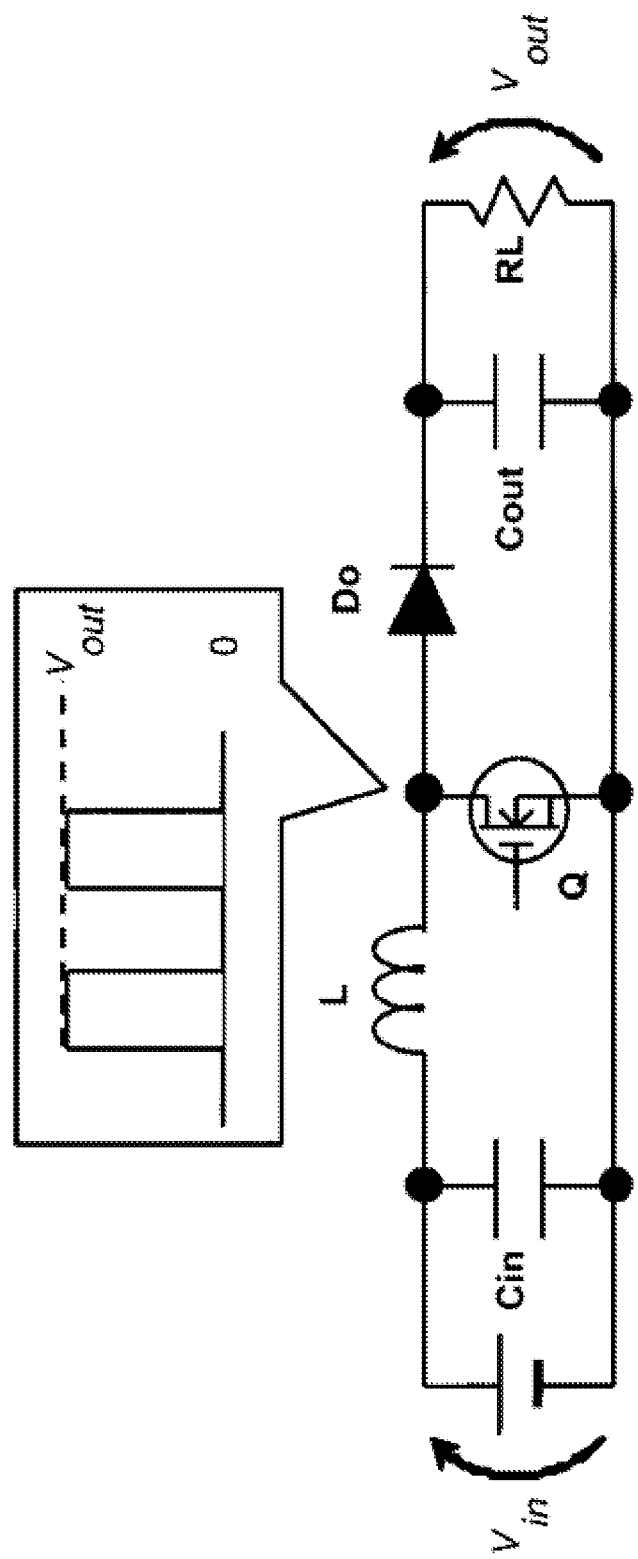
FIG. 4b is circuit diagram of a step-up converter usable in the charge device and the charge-discharge device of the present invention.
Figure 4C:
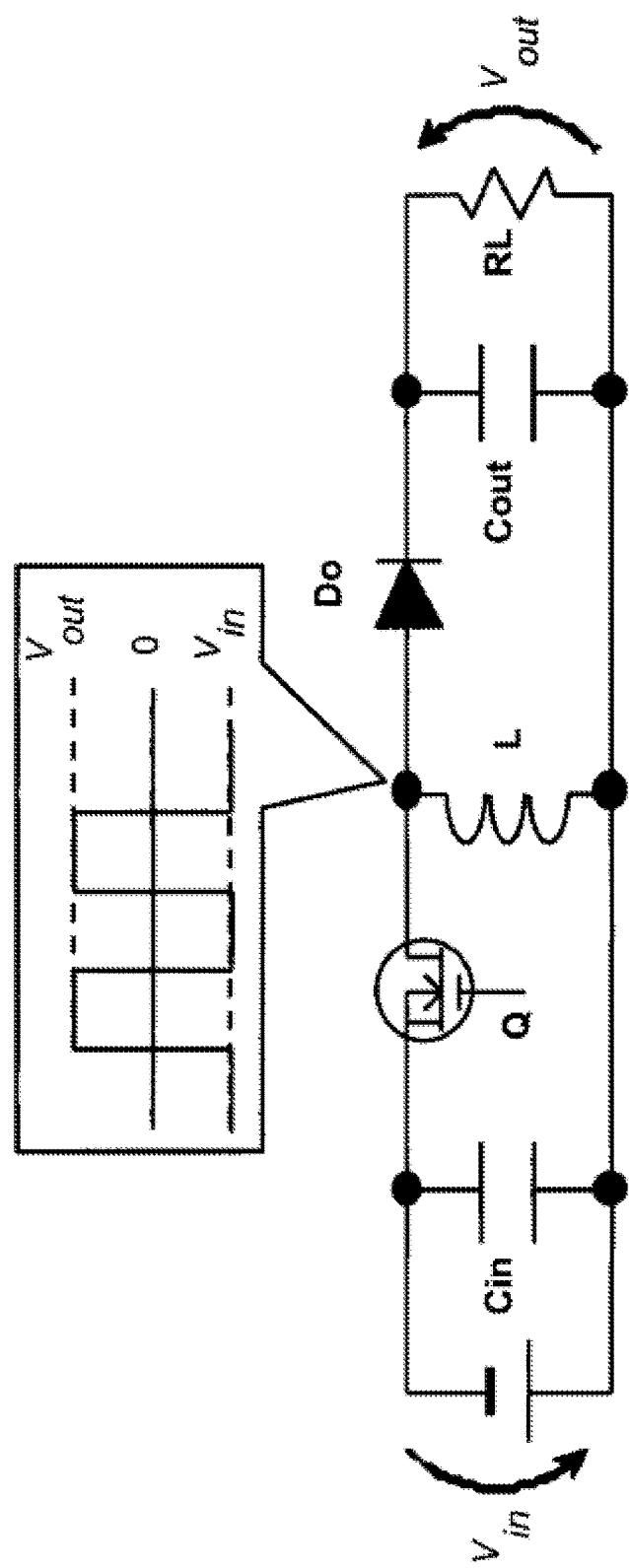
FIG. 4c is circuit diagram of a step-up and step-down converter usable in the charge device and the charge-discharge device of the present invention.
Figure 4D:
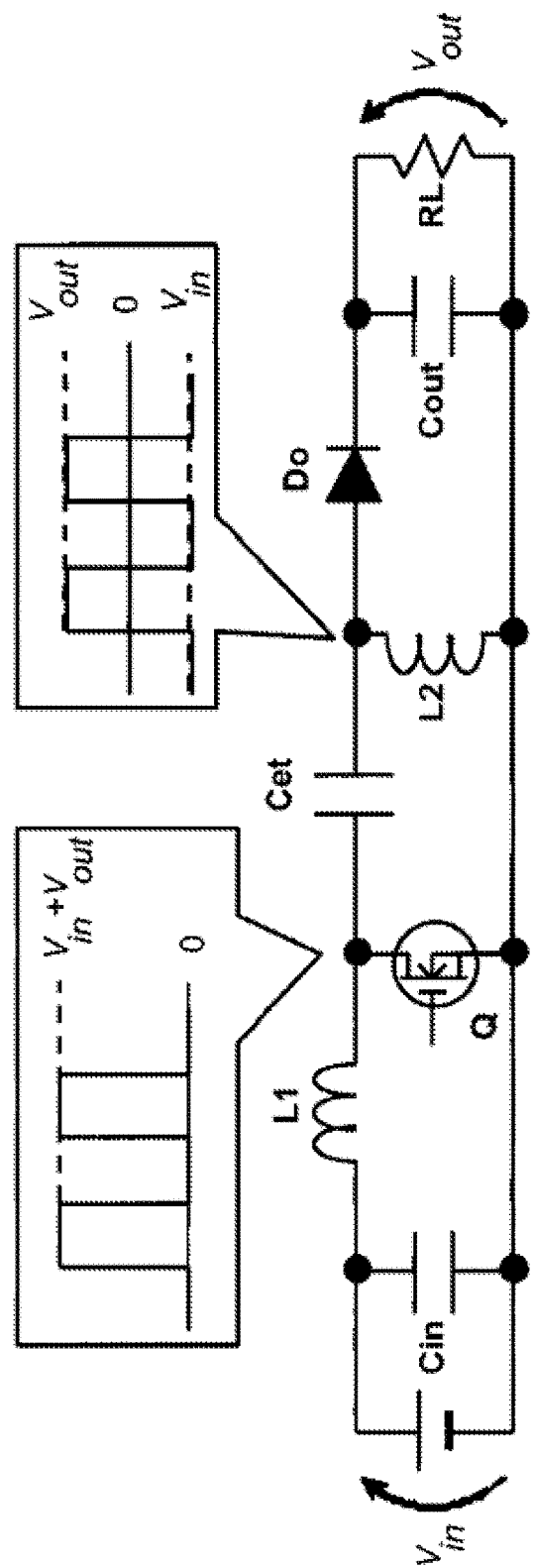
FIG. 4d is circuit diagram of a SEPIC converter usable in the charge device and the charge-discharge device of the present invention.
Figure 4E:
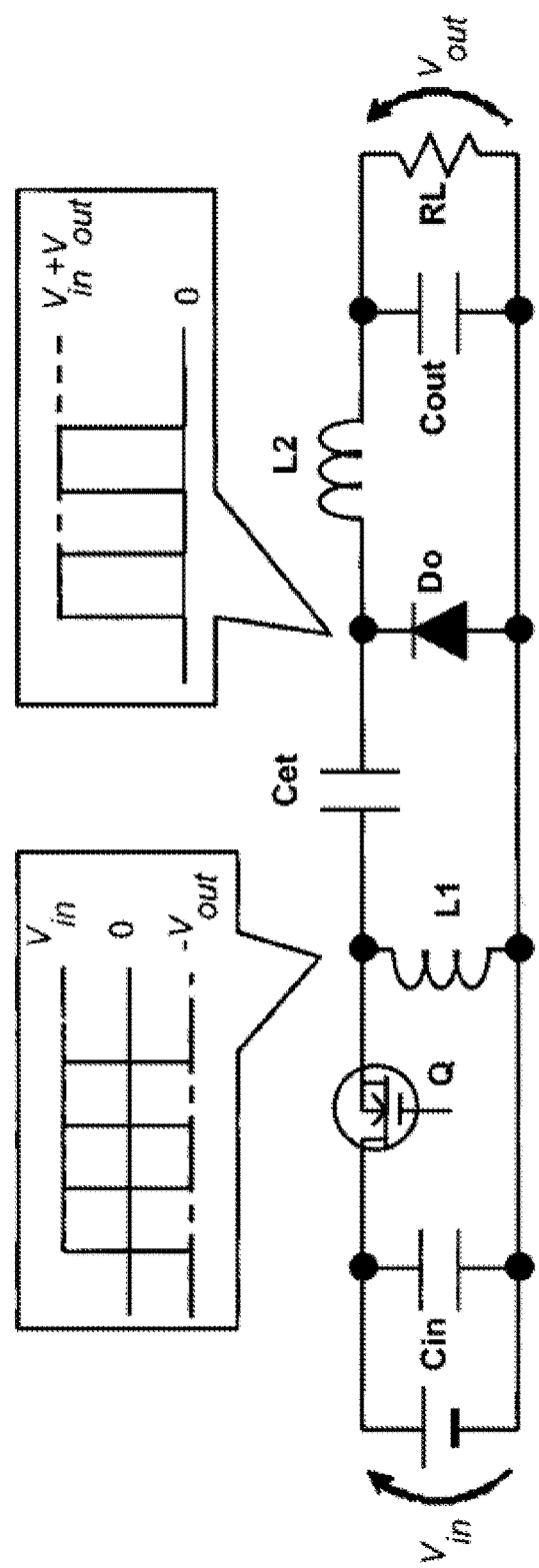
FIG. 4e is circuit diagram of a Zeta converter usable in the charge device and the charge-discharge device of the present invention.
Figure 4F:
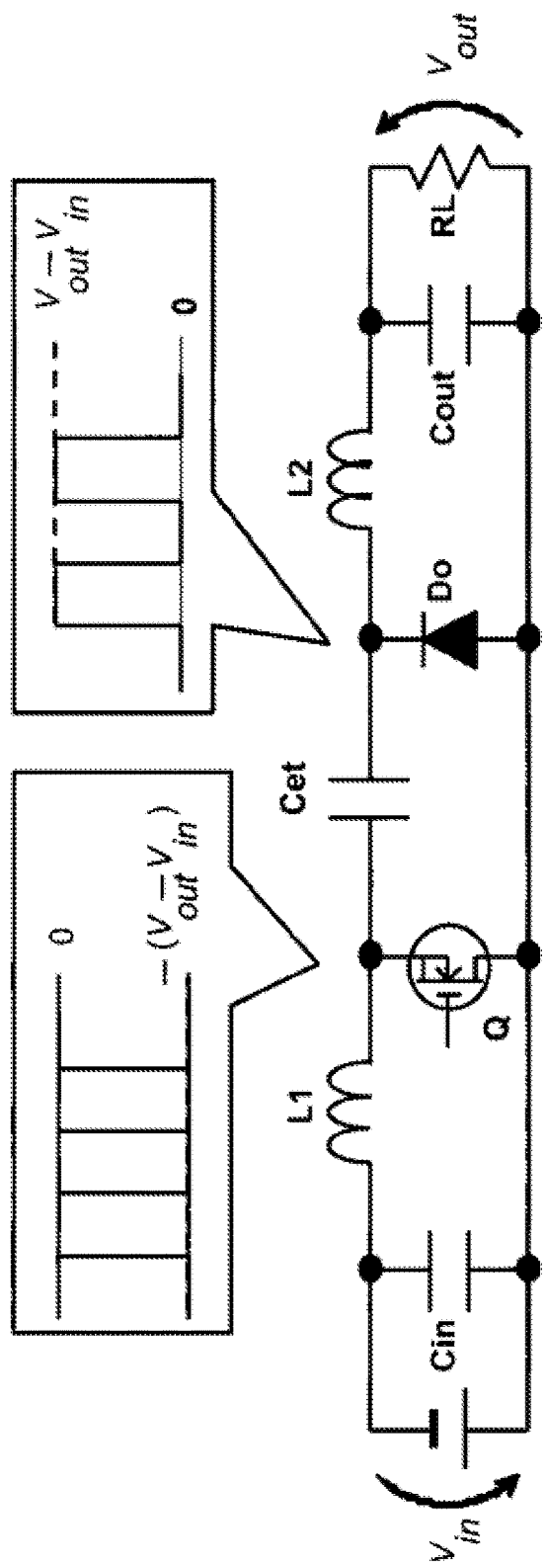
FIG. 4f is circuit diagram of a Cuk converter usable in the charge device and the charge-discharge device of the present invention.

In the case where there are two switching nodes, as in the SEPIC converter illustrated in FIG. 4d, the Zeta converter illustrated in FIG. 4e, and the Cuk converter illustrated in FIG. 4f, either of the nodes may be used. Although a non-isolated PWM (Pulse Width Modulation) converter has been taken as an example here, it is also possible to use any other non-isolated converter, an isolated converter (half-bridge, full-bridge, etc.), a resonant converter, and the like. Each of the converters illustrated here is a unidirectional converter using a diode, and is therefor usable only in a charge device (or only in a discharge device). A charge-discharge device of the present invention can be constructed by replacing the diode with a switch so as to allow the above converter to be used as a bidirectional converter, as described later.

Figure 5:
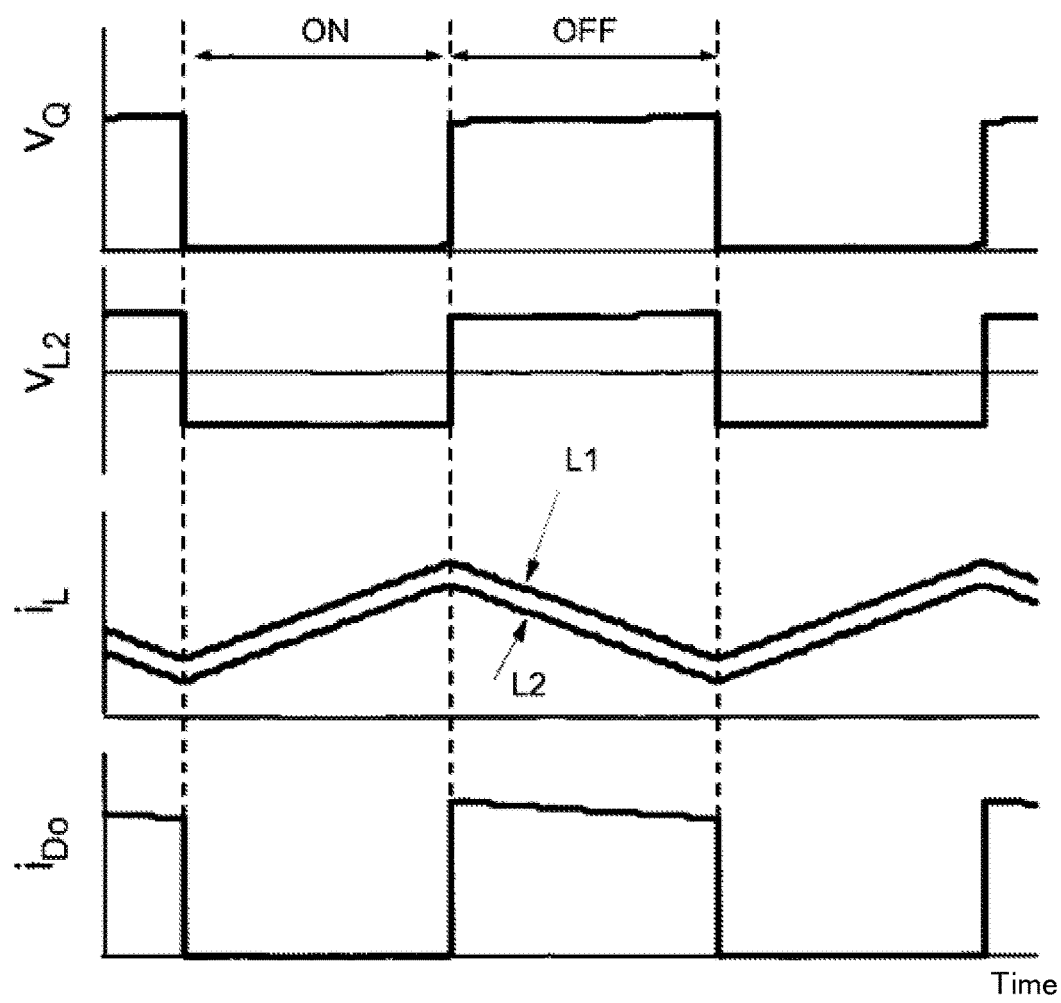
FIG. 5 is a graph presenting an operating waveform of the SEPIC converter.
Figure 6A:
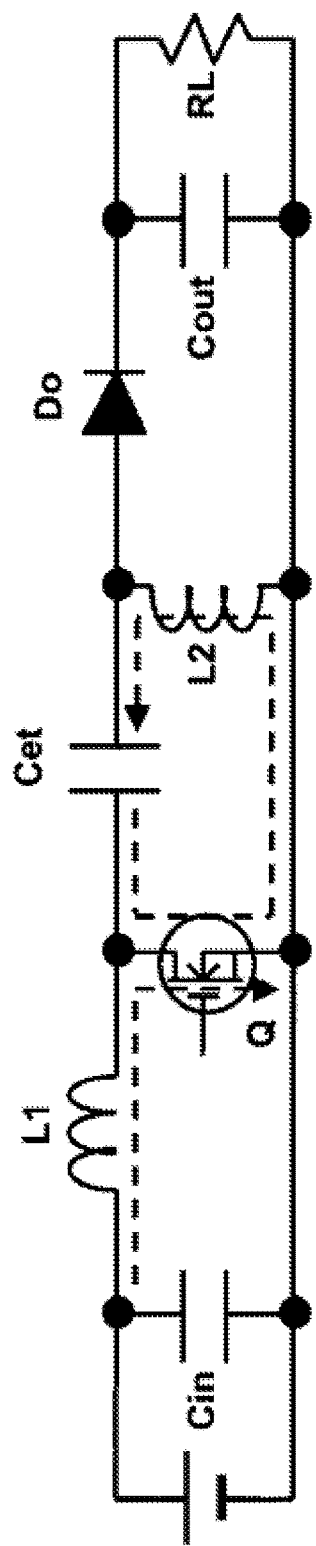
FIG. 6a is a diagram illustrating a current pathway under a condition where a switch Q is in an ON state, during operation of the SEPIC converter.
Figure 6B:
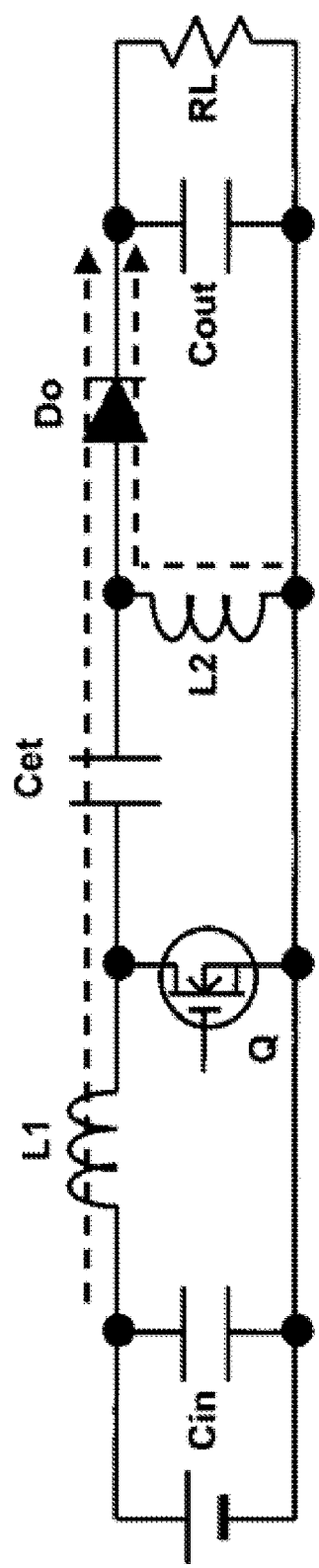
FIG. 6b is a diagram illustrating a current pathway under a condition where the switch Q is in an OFF state, during operation of the SEPIC converter.

As an example, operating waveforms and current pathways during operation of the SEPIC converter in FIG. 4d among the converters illustrated in FIGS. 4a to 4f are illustrated, respectively, in FIG. 5 and FIGS. 6a and 6b. In the graph of FIG. 5, $V_Q$ represents a voltage applied to a switch Q (wherein a polarity causing a current to flow through the switch Q in a direction illustrated in FIG. 6a is defined as positive), and $V_{L2}$ represents a voltage applied to an inductor L2 (wherein a polarity causing a current to flow through the inductor L2 in a direction illustrated in FIG. 6a is defined as negative). $i_L$ represents a current flowing through an inductor L1 (L1 in the graph of FIG. 5) and a current flowing through the inductor L2 (L2 in the graph of FIG. 5), and $i_{Do}$ represents a current flowing through a diode Do in a forward direction.

During a time period in which the switch Q is in an ON state, a voltage is applied from each of a capacitor Cin and a capacitor Cet to a respective one of the inductor L1 and the inductor L2, so that a current flowing through each of the inductors L1, L2 linearly increases. A voltage applied to the switch Q in this process is zero (on-resistance is ignored). During a time period in which the switch Q is in an OFF state, a current flowing through each of the inductors L1, L2 flows toward a load via the diode Do. Although an induced electromotive force of the inductor L1 is applied to the switch Q, no current flows therethrough because the switch Q is kept in the OFF state. Further, a voltage (having a polarity opposite to that of the voltage applied from the capacitor Cet during the ON time period of the switch Q) is applied from a capacitor Cout to the inductor L2. As above, along with a switching operation, each of the voltage $V_Q$ of the switch Q and the voltage $V_{L2}$ of the inductor L2 is formed as a rectangular waveform voltage.

Figure 7:
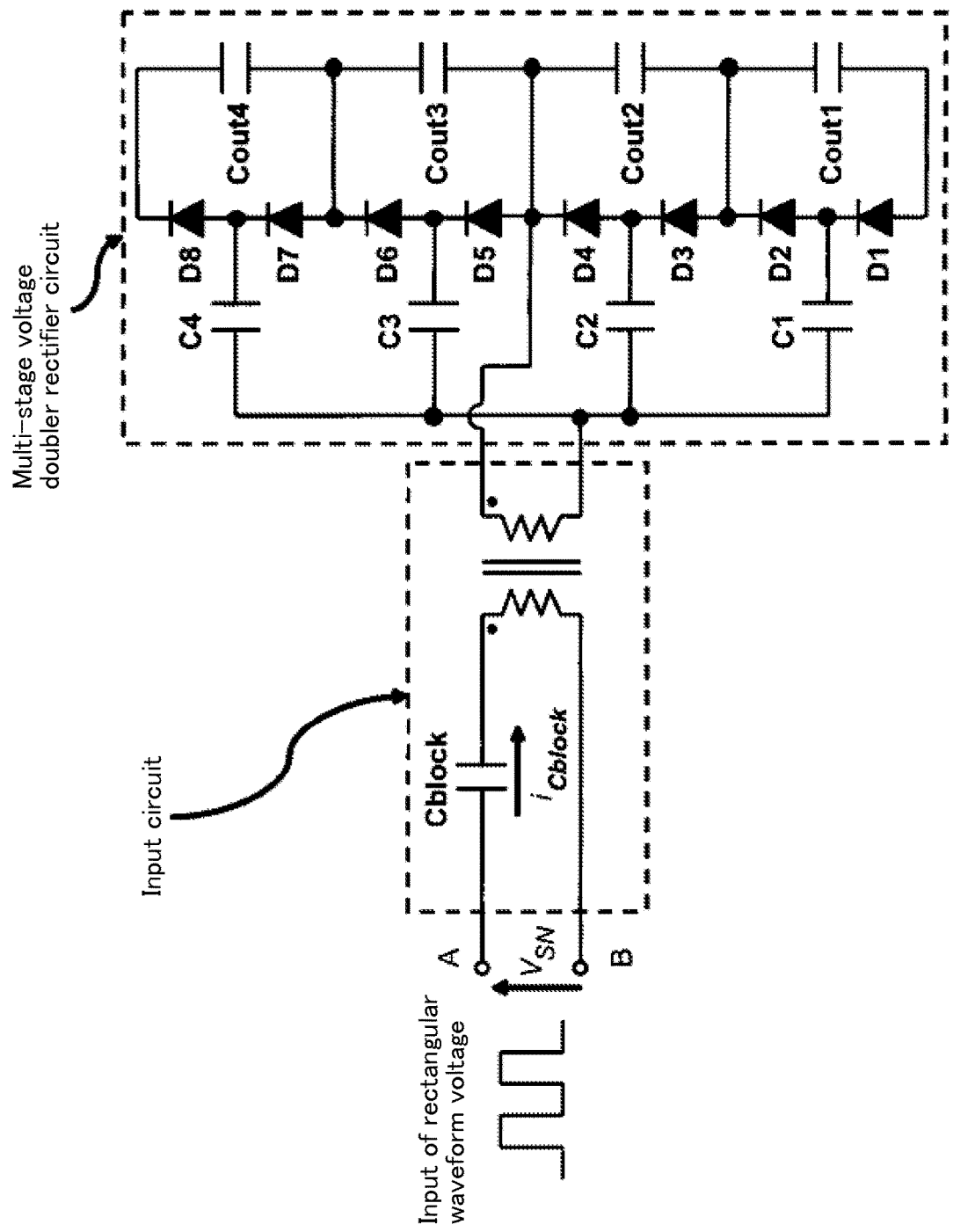
FIG. 7 is a circuit diagram illustrating one example of a multi-stage voltage doubler rectifier circuit and an input circuit.

One example of a multi-stage voltage doubler rectifier circuit and an input circuit is illustrated in FIG. 7. The multi-stage voltage doubler rectifier circuit is configured such that two series-connected diodes D1, D2; D3, D4; D5, D6; D7, D8, are connected in parallel, respectively, to series-connected capacitors Cout1 to Cout4, and intermediate capacitors C1 to C4 are connected, respectively, to intermediate points of the two series-connected diodes.

The input circuit is connected to the multi-stage voltage doubler rectifier circuit, and configured to input, into the multi-stage voltage doubler rectifier circuit, a voltage which is output from an element of the converter. In the example illustrated in FIG. 7, the input circuit comprises a first coil connected to the side of the element of the converter, and a second coil magnetically coupled to the first coil, e.g., through an arbitrary core, and further connected to the multi-stage voltage doubler rectifier circuit. A capacitor Cblock connected to the first coil is a blocking capacitor for blocking a DC (direct current) component of a current flowing out from the element of the converter. The number of turn ratio of the first coil:the second coil is expressed as N:1.

A rectangular waveform voltage generated at an element (switching node) of the aforementioned converter is input between terminals A, B of the input circuit. Then, according to a change in the input rectangular waveform voltage, a charging and discharging current flows through the capacitors Cout1 to Cout4, so that a group of the odd-numbered diodes D1, D3, D5, D7 and a group of the even-numbered diodes D2, D4, D6, D8 in the multi-stage voltage doubler rectifier circuit are alternately conducted.

Figure 8:
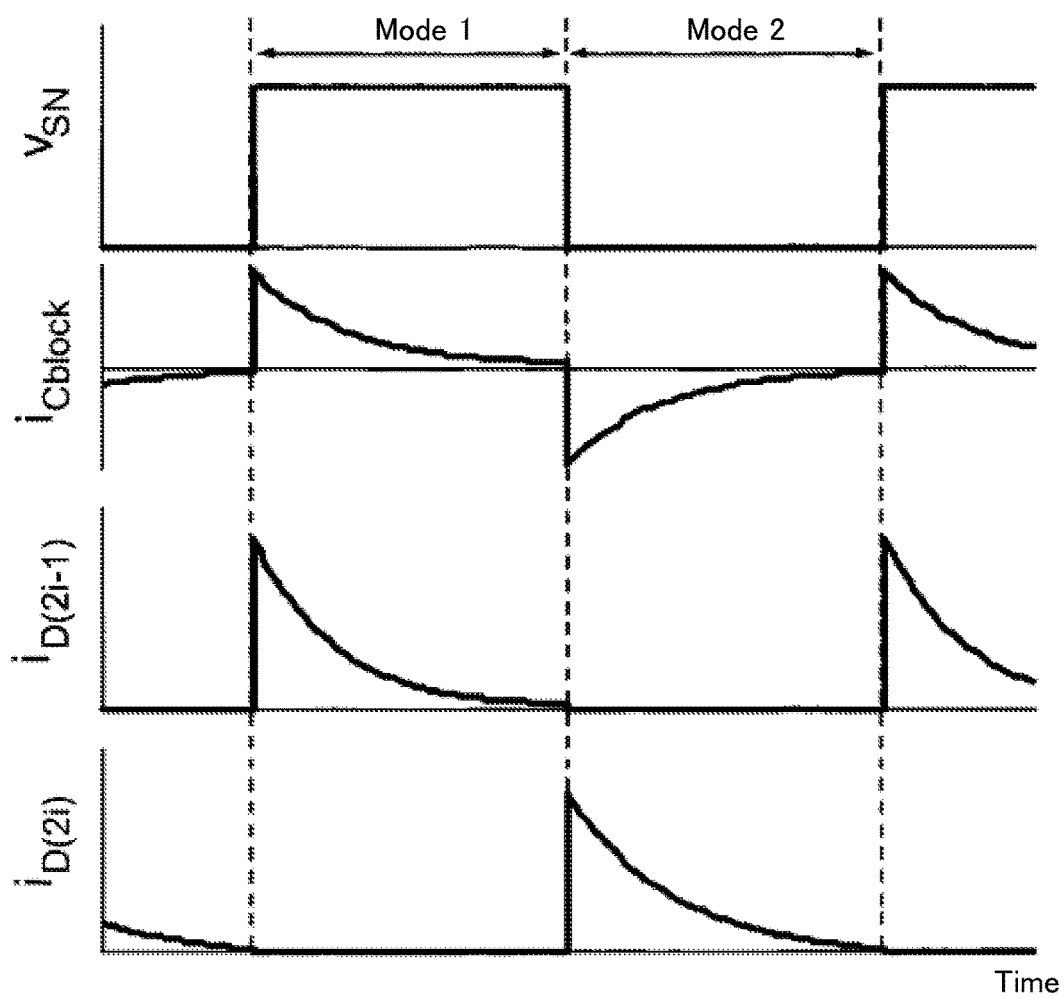
FIG. 8 is a graph presenting operating waveforms in the multi-stage voltage doubler rectifier circuit and the input circuit illustrated in FIG. 7.

Specifically, a rectangular waveform voltage (e.g., $V_Q$ in FIG. 5) presented in the graph of $V_{SN}$ in FIG. 8, is input into the input circuit, and, after being subjected to transformation by the transformer and to a DC component removal action of the blocking capacitor Cblock, input into the multi-stage voltage doubler rectifier circuit. In that case, in a mode 1 (see $V_{SN}$ presented in the graph of FIG. 8), a current flows along a pathway illustrated in FIG. 9a, and, in a mode 2 (see $V_{SN}$ presented in the graph of FIG. 8), a current flows along a pathway illustrated in FIG. 9b.

Assuming that a capacitance of each of the capacitors Cout1 to Cout4 is sufficiently large as compared to a capacitance of each of the intermediate capacitors C1 to C4, when an operating frequency of the input voltage $V_{SN}$ is sufficiently high, it can be deemed that voltages $V_{Cout1}$, $V_{Cout2}$, $V_{Cout3}$, $V_{Cout4}$ across the respective capacitors Cout1, Cout2, Cout3, Cout4 are constant before and after one cycle. On the assumption that a magnitude of the $V_{SN}$ in the mode 1 is E (thus, a voltage to be input from the second coil into the multi-stage voltage doubler rectifier circuit is E/N), and magnitudes of voltages across the respective intermediate capacitors C1, C2, C3, C4 in the mode 1 are, respectively, $V_{C1a}$, $V_{C2a}$, $V_{C3a}$ and $V_{C4a}$, the following formula group (1) can be obtained by applying the Kirchhoff's second law to the current pathway in FIG. 9a.

$$E/N - V_{Cout2} - V_{Cout1} - V_{C1a} = 0$$

$$E/N - V_{Cout2} - V_{C2a} = 0$$

$$E/N - V_{C3a} = 0$$

$$E/N + V_{Cout3} - V_{C4a} = 0 \quad (1)$$

Figure 9A:
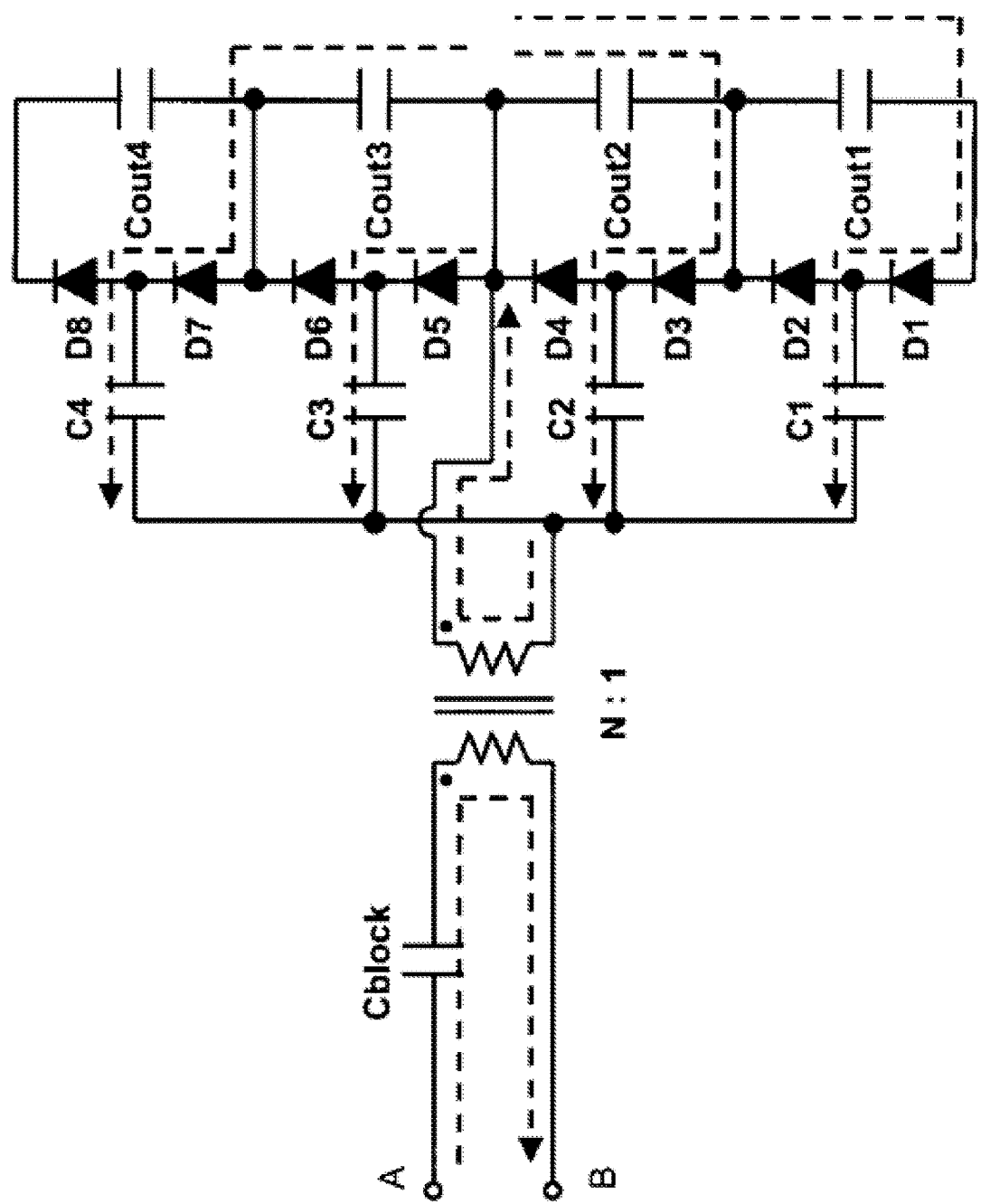
FIG. 9a is a diagram illustrating a current pathway in a mode 1, during operations of the multi-stage voltage doubler rectifier circuit and the input circuit illustrated in FIG. 7.
Figure 9B:
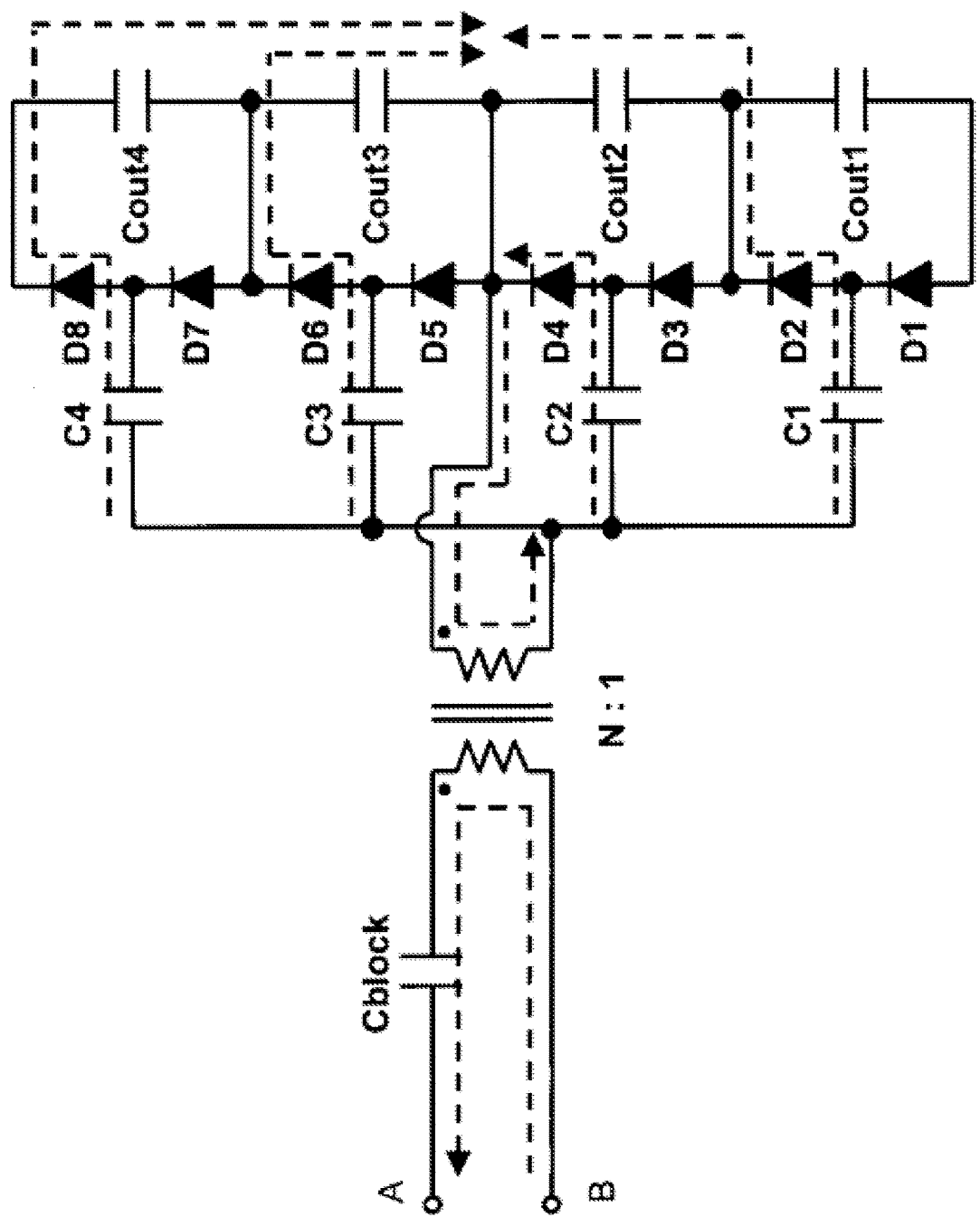
FIG. 9b is a diagram illustrating a current pathway in a mode 2, during operations of the multi-stage voltage doubler rectifier circuit and the input circuit illustrated in FIG. 7.

As to $V_{Cout1}$ to $V_{Cout4}$, a voltage having a polarity causing a current to flow through the capacitor Cout3 in a direction illustrated in FIG. 9a is defined as positive. As to $V_{C1a}$ to $V_{C4a}$ (and aftermentioned $V_{C1b}$ to $V_{C4b}$), a voltage having a polarity causing a current to flow through each of the intermediate capacitors C1 to C4 in a direction illustrated in FIG. 9a is defined as negative.

Similarly, on the assumption that a magnitude of $V_{SN}$ in the mode 2 is 0 (For example, a voltage of the inductor L2 comprised in the SEPIC converter in FIG. 4d has positive and negative values. In this case, however, a voltage reference point may be set at a negative voltage so as to allow the $V_{SN}$ in the mode 2 to become zero), and magnitudes of voltages across the respective intermediate capacitors C1, C2, C3, C4 in the mode 2 are, respectively, $V_{C1b}$, $V_{C2b}$, $V_{C3b}$ and $V_{C4b}$, the following formula group (2) can be obtained by applying the Kirchhoff's second law to the current pathway in FIG. 9b.

$$V_{Cout2} + V_{C1b} = 0$$

$$V_{C2b} = 0$$

$$-V_{Cout3} + V_{C3b} = 0$$

$$-V_{Cout3} - V_{Cout4} + V_{C4b} = 0 \quad (2)$$

Based on the above formula groups (1) and (2), voltage variations Δ (delta) $V_{C1} = V_{C1a} - V_{C1b}$, Δ (delta) $V_{C2} = V_{C2a} - V_{C2b}$, Δ (delta) $V_{C3} = V_{C3a} - V_{C3b}$, Δ (delta) $V_{C4} = V_{C4a} - V_{C4b}$ in the intermediate capacitors C1 to C4 between the mode 1 and the mode 2 are calculated as follows.

$$\Delta V_{C1} = E/N - V_{Cout1}$$

$$\Delta V_{C2} = E/N - V_{Cout2}$$

$$\Delta V_{C3} = E/N - V_{Cout3}$$

$$\Delta V_{C4} = E/N - V_{Cout4} \quad (3)$$

On the assumption that capacitances of the intermediate capacitors C1 to C4 are, respectively, G1, G2, G3, G4, considering the relationship: current=frequency×(multiplied by) charge amount=frequency×(multiplied by) capacitance× (multiplied by) voltage variation, currents $I_{C1}$, $I_{C2}$, $I_{C3}$, $I_{C4}$ flowing, respectively, from the intermediate capacitors C1 to C4 to the capacitors Cout1 to Cout4 are calculated as follows.

$$I_{C1} = f \times G1 \times (E/N - V_{Cout1})$$

$$I_{C2} = f \times G2 \times (E/N - V_{Cout2})$$

$$I_{C3} = f \times G3 \times (E/N - V_{Cout3})$$

$$I_{C4} = f \times G4 \times (E/N - V_{Cout4}) \quad (4)$$

In this formula group (4), f is a frequency of $V_{SN}$. From the Ohm's law, it turns out that each of f×(multiplied by) G1, f×(multiplied by) G2, f×(multiplied by) G3 and f×(multiplied by) G4 is a reciprocal of electrical resistance, i.e., dimension of conductance.

Figure 10:
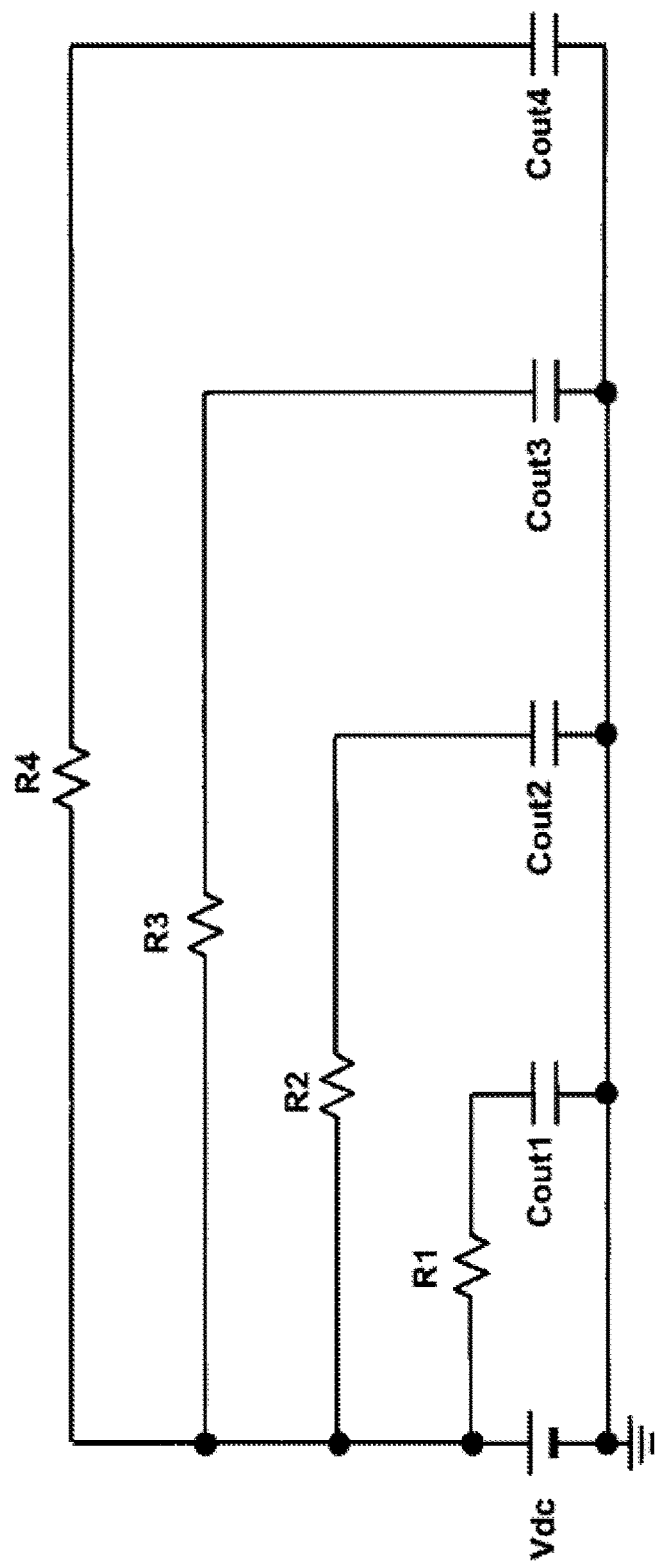
FIG. 10 is a circuit diagram of an equivalent circuit of the multi-stage voltage doubler rectifier circuit illustrated in FIG. 7.

Thus, from the formula group (4), the circuit illustrated in FIG. 7 can be replaced with an equivalent circuit illustrated in FIG. 10. In this equivalent circuit, an equivalent power supply Vdc is a DC power supply having an output voltage E/N, and equivalent resistors R1 to R4 are replacements of charging-discharging operations of the respective intermediate capacitors C1 to C4 to equivalent resistors. Resistance values of the equivalent resistors R1, R2, R3, R4 can be expressed, respectively, as 1/(f×(multiplied by) G1), 1/(f× (multiplied by) G2), 1/(f×(multiplied by) G3) and 1/(f× (multiplied by) G4). In the case where G1, G2, G3 and G4 are equal to each other, values of R1, R2, R3 and R4 also become equal to each other. Thus, in the case where voltages across respective capacitors Cout1 to Cout4 in FIG. 10 are equal to each other, currents flowing through the respective equivalent resistors R1 to R4 also become equal to each other. That is, the capacitors Cout1 to Cout4 are equally charged.

As a result, the voltages across the respective capacitors Cout1 to Cout4 becomes equal to each other in a steady state. Each of the voltages across the capacitors Cout1 to Cout4 in a steady state is E/N (where a voltage drop in each of the diodes is ignored).

First Embodiment

Figure 11:
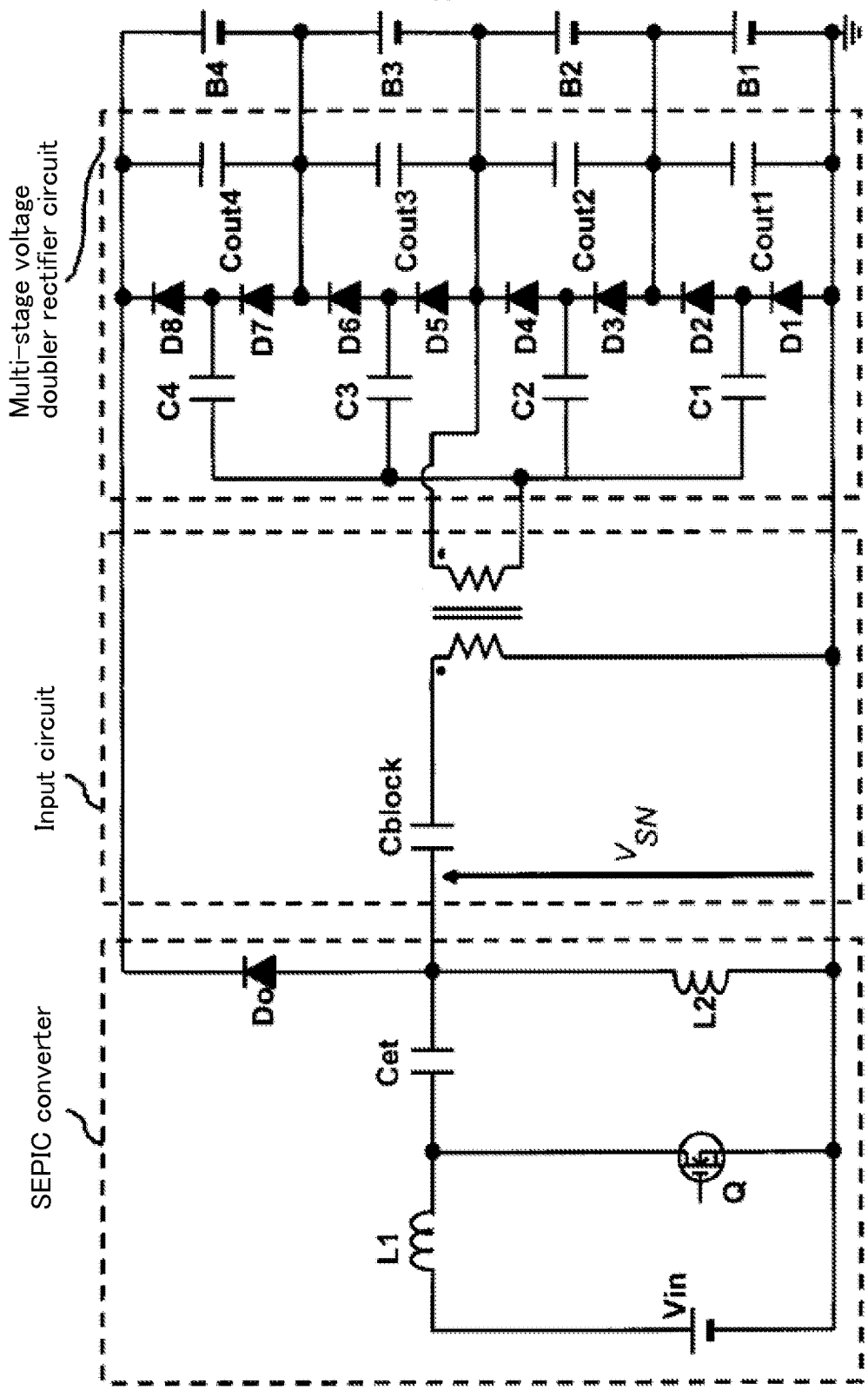
FIG. 11 is a circuit diagram of a system in which series-connected electricity storage cells B1 to B4 are connected to an equalization function-equipped charge device comprising a SEPIC converter, an input circuit and a multi-stage voltage doubler rectifier circuit, according to a first embodiment of the present invention.

FIG. 11 illustrates a circuit diagram of a voltage equalization function-equipped charging system in which four series-connected electricity storage cells group B1 to B4 are connected to a charge device according to a first embodiment of the present invention, wherein the charge device comprises the SEPIC converter illustrated in FIG. 4d, and the input circuit and the multi-stage voltage doubler rectifier circuit illustrated in FIG. 7. A switching node composed of a connection point of the capacitor Cet, the diode Do and the inductor L2 in the SEPIC converter is connected to the multi-stage voltage doubler rectifier circuit via the input circuit. An output terminal, i.e., the diode Do, of the SEPIC converter is connected to the capacitors Cout1 to Cout4, and the capacitors Cout1 to Cout4 are connected to the electricity storage cells B1 to B4. Therefore, the electricity storage cells B1 to B4 are serially charged by an output voltage of the SEPIC converter. On the other hand, the multi-stage voltage doubler rectifier circuit is connected to each of the electricity storage cells B1 to B4. As described using the formula groups (1) to (4), the capacitors Cout1 to Cout4 are equally charged, so that currents are supplied, respectively, to the electricity storage cells B1 to B4 connected in parallel thereto, depending on a state of voltage variation to thereby eliminate the voltage variation. The SEPIC converter is operable to charge the electricity storage cells B1 to B4 under PWM control. A relationship between a magnitude of an input voltage from an input power supply Vin (the magnitude of the input voltage will hereinafter referred to as "$V_{in}$") and a total voltage $V_{total}$ of the B1 to B4 is expressed as the following formula using a time ratio D (a ratio of an ON time period to one switching cycle period of the switch Q).

$$\frac{V_{total}}{V_{in}} = \frac{D}{(1-D)} \quad (5)$$

It is considered that the equalization operation described using the formula groups (1) to (4) and the charging operation according to the formula (5) are performed in parallel, thereby making it possible to equally charge the electricity storage cells B1 to B4.

Figure 1:
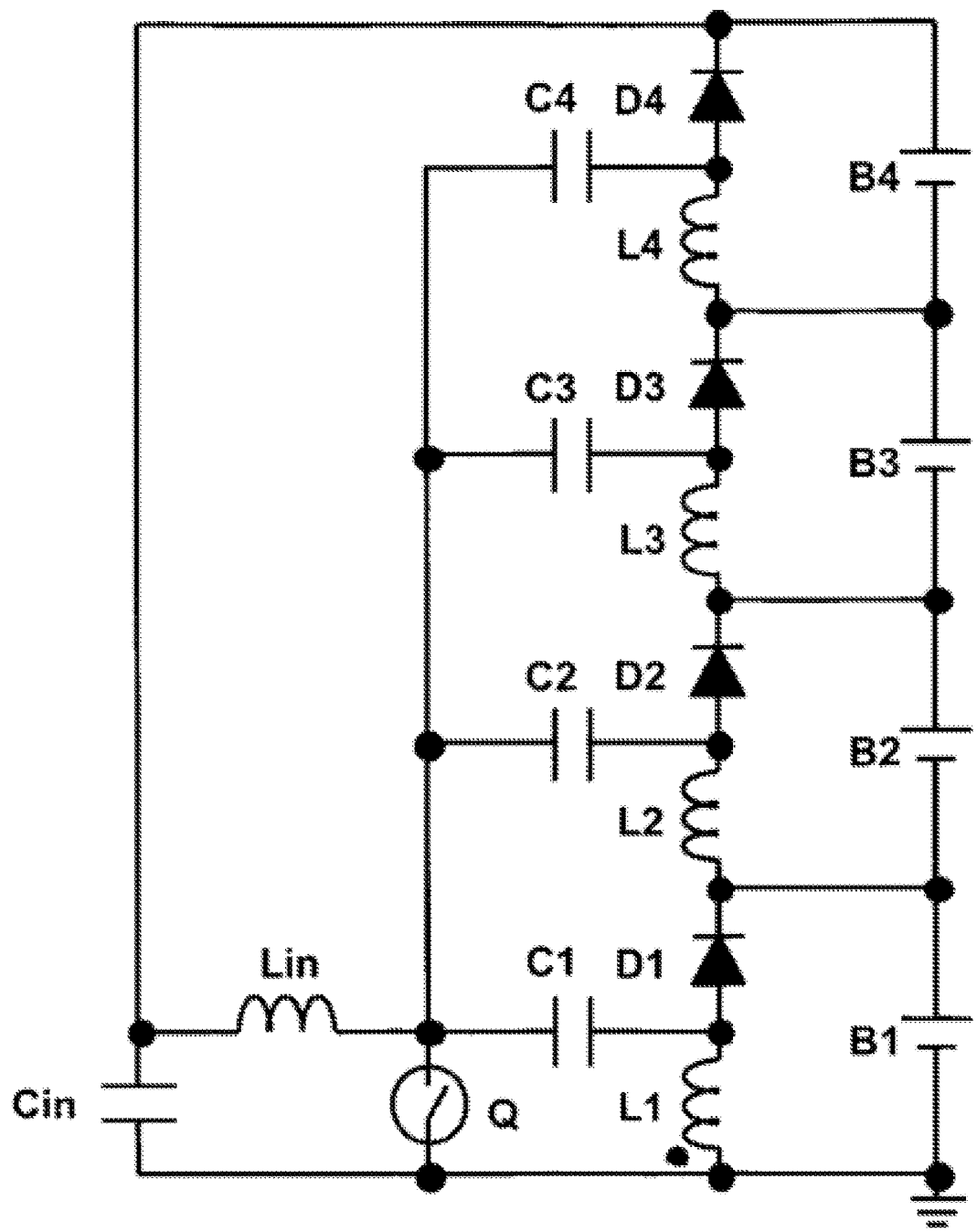
FIG. 1 is a circuit diagram of a conventional one-transistor equalization circuit described in the Patent Document 1.
Figure 2:
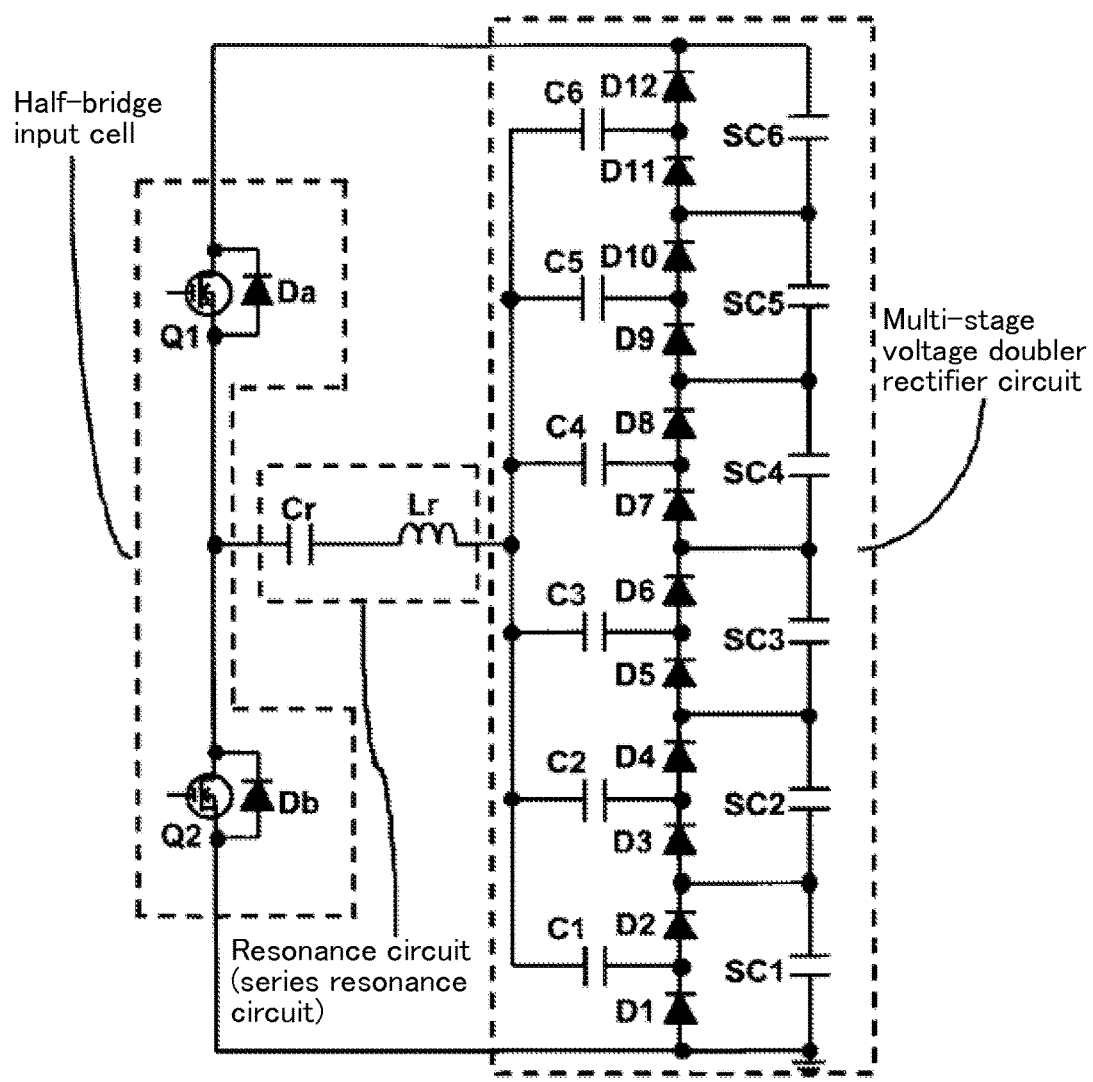
FIG. 2 is a circuit diagram of a conventional two-transistor equalization circuit proposed in Japanese Patent Application No. 2012-046569.
Figure 3:
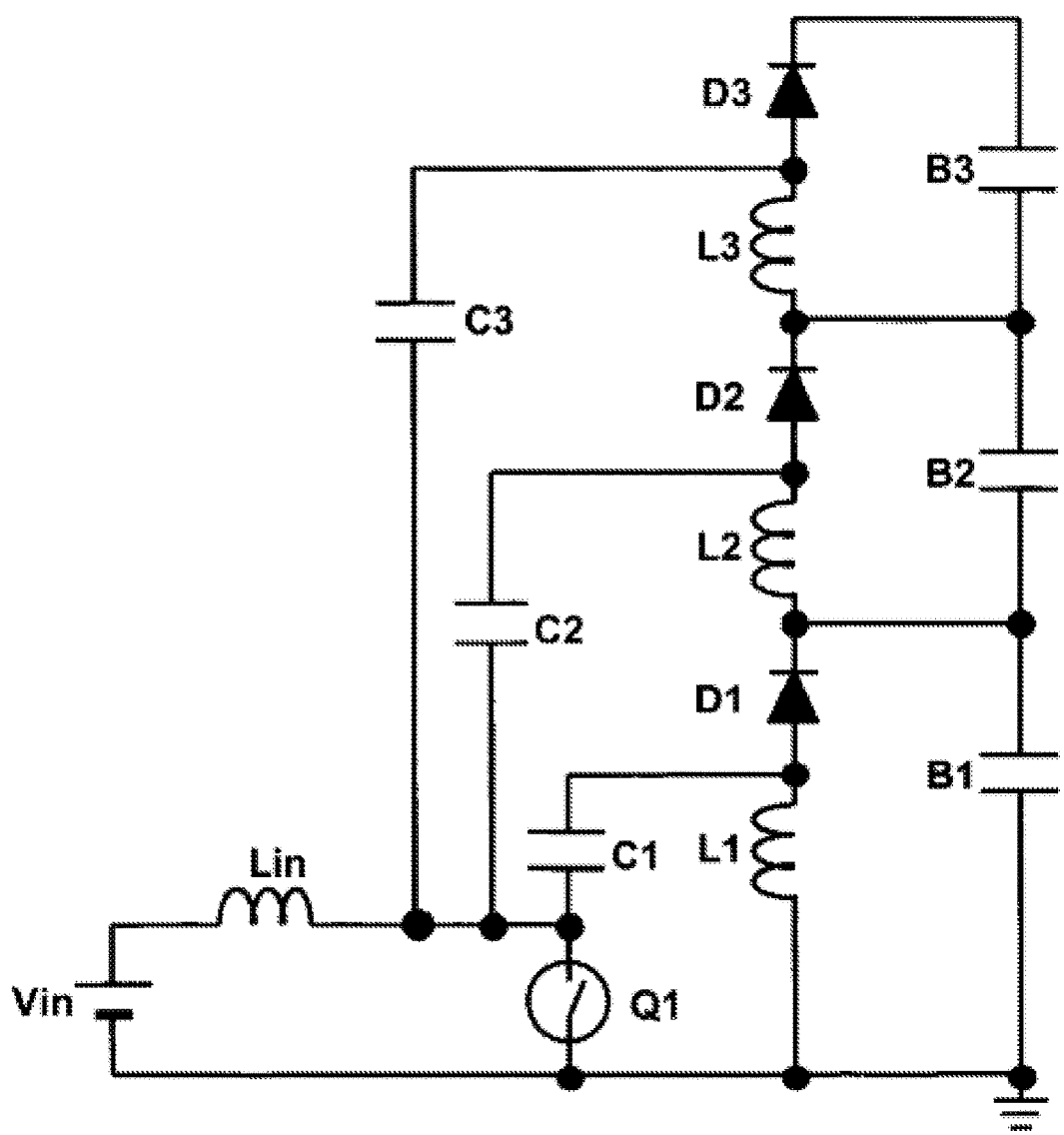
FIG. 3 is a circuit diagram of a conventional one-transistor equalization circuit described in the Patent Document 2.

The number of switches required for the equalization function-equipped charge device according to the present invention is only one (switch Q) in the converter, and the multi-stage voltage doubler rectifier circuit itself for providing a balancing function can be constructed in a switchless manner. Thus, the equalization function-equipped charge device according to the present invention can be constructed using a small number of switches, as with the conventional equalization circuits illustrated in FIGS. 1 and 2, so that it becomes possible to significantly simplify a circuit configuration, as compared to the various conventional schemes requiring a large number of switches. Further, in this equalization function-equipped charge device, the converter section having a charging function and the multi-stage voltage doubler rectifier circuit having an equalization function can be optimally designed, individually, so that it becomes possible to achieve compact and economical design, as compared to the conventional equalization function-equipped charger devices. For example, generally, an electric power required for the equalization is significantly less than that required for charging. Thus, it is optimal to design in such a manner that elements for large electric power are used in the converter, and elements for small electric power are used in the multi-stage voltage doubler rectifier circuit.

The charger illustrated in FIG. 11 has been described based on the configuration in which the switching node composed of the connection point of the capacitor Cet, the diode Do and the inductor L2 in the SEPIC converter is connected to the multi-stage voltage doubler rectifier circuit via the input circuit (a configuration in which the multi-stage voltage doubler rectifier circuit is connected to the inductor L2 to be applied with a rectangular waveform voltage, via the input circuit). Alternatively, another switching node, i.e., a switching node composed of a connection point of the capacitor Cet, the switch Q and the inductor L1, may be connected to the multi-stage voltage doubler rectifier circuit via the input circuit to have a similar function (a configuration in which the multi-stage voltage doubler rectifier circuit is connected to the switch Q to be applied with a rectangular waveform voltage, via the input circuit). The voltage equalization function-equipped charge device may be constructed using converters other than the SEPIC converter.

Figure 12:
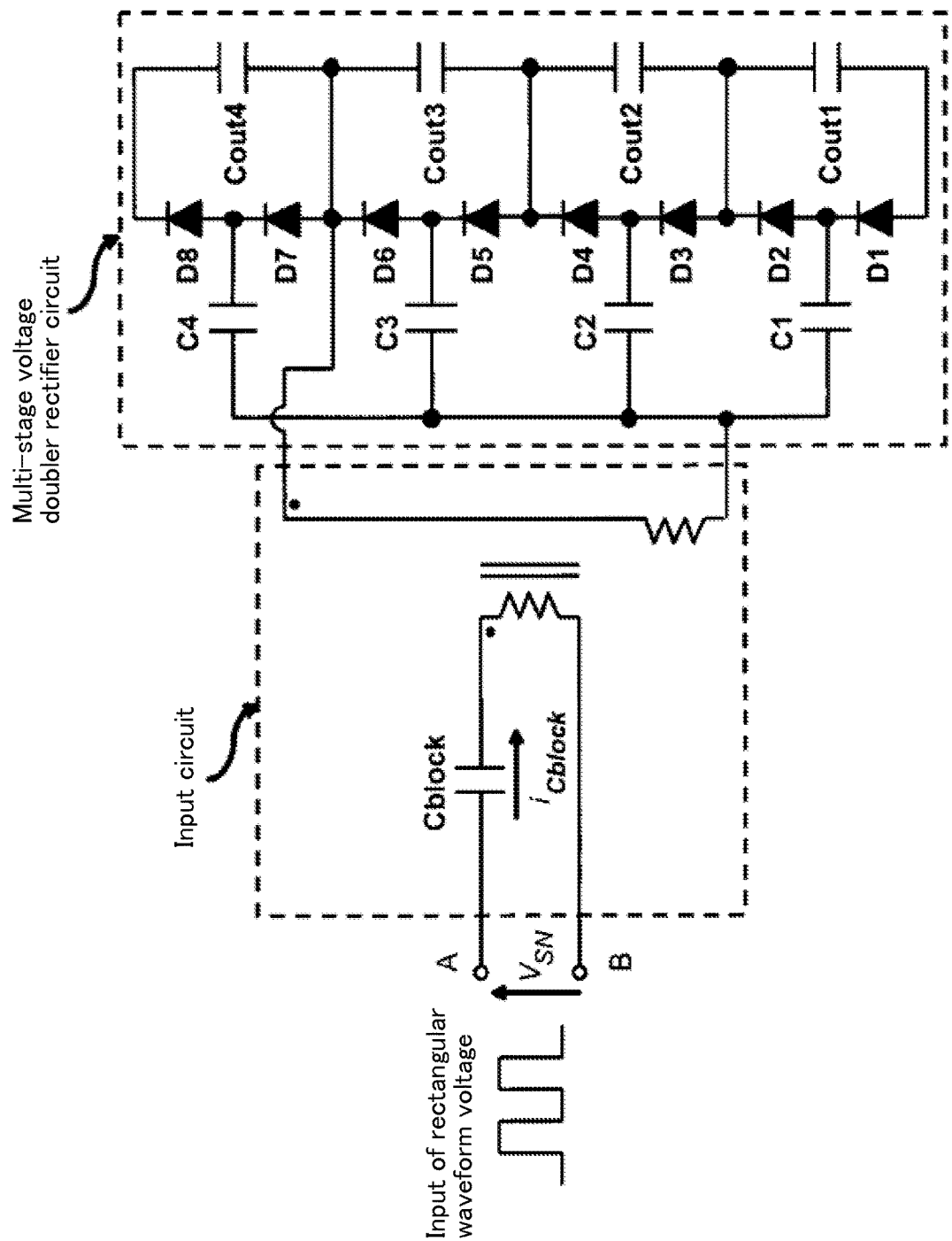
FIG. 12 is a circuit diagram, wherein the circuit configuration in FIG. 7 is changed in terms of a connection point between the multi-stage voltage doubler rectifier circuit and the input circuit.

It should be noted that a position of the multi-stage voltage doubler rectifier circuit to which a voltage for the equalization is input from the input circuit is not limited to the position illustrated in FIG. 7, but may be any other suitable position. As one example, FIG. 12 illustrates a circuit diagram, wherein the circuit configuration in FIG. 7 is changed in terms of a connection point between the multi-stage voltage doubler rectifier circuit and the input circuit.

Figure 13A:
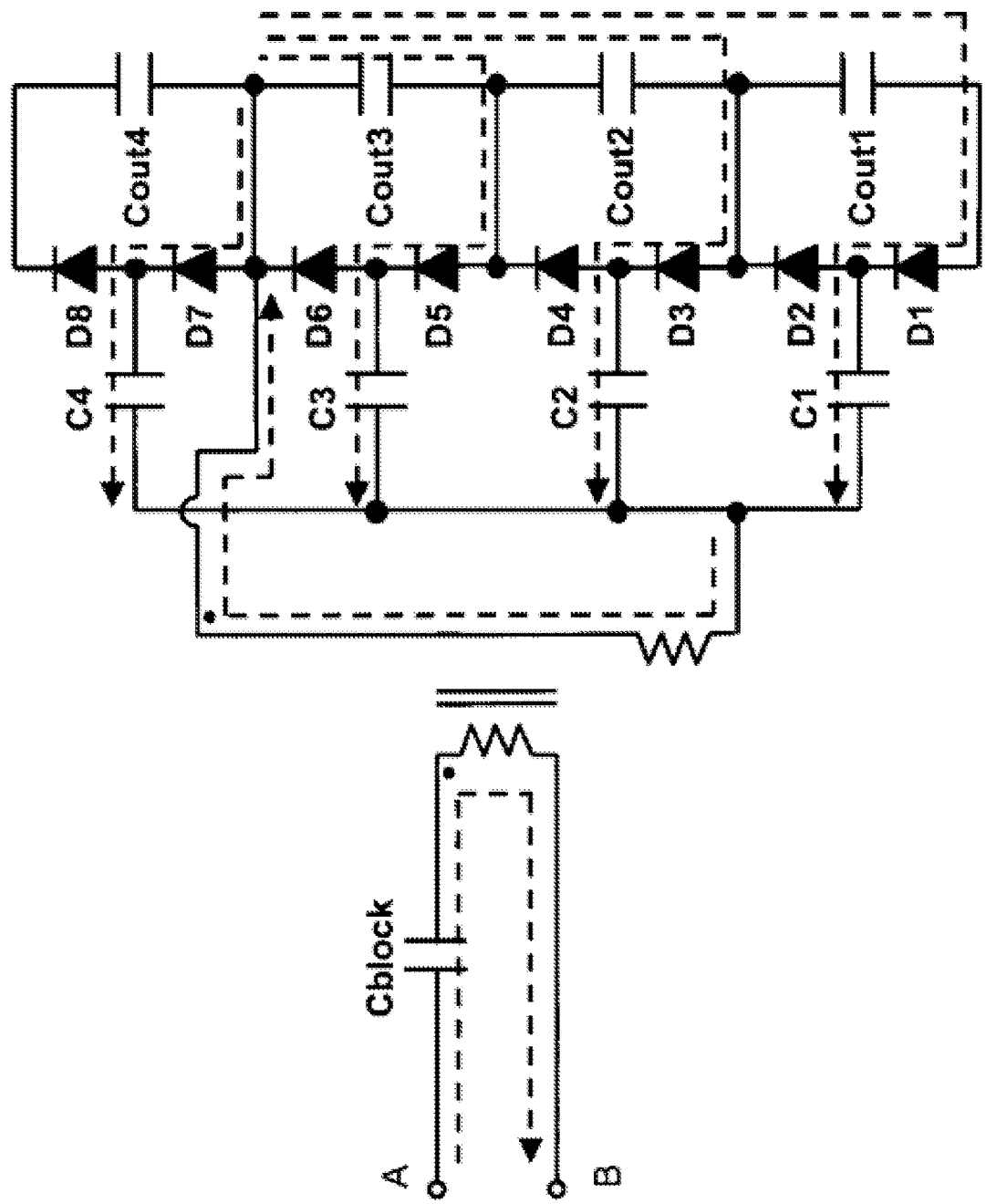
FIG. 13a is a diagram illustrating a current pathway in a mode 1, during operations of the multi-stage voltage doubler rectifier circuit and the input circuit illustrated in FIG. 12.
Figure 13B:
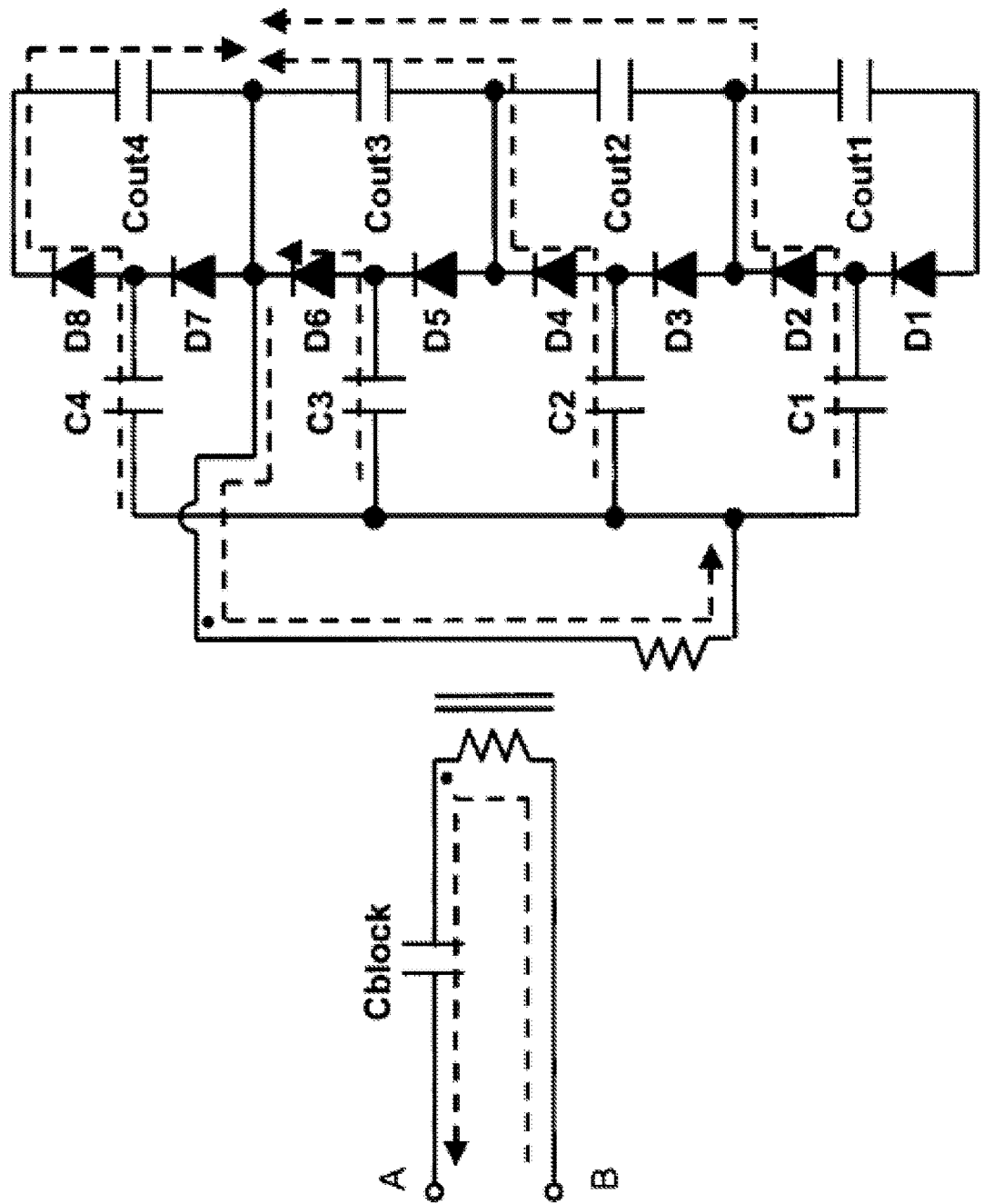
FIG. 13b is a diagram illustrating a current pathway in a mode 2, during operations of the multi-stage voltage doubler rectifier circuit and the input circuit illustrated in FIG. 12.

Assuming that a capacitance of each of the capacitors Cout1 to Cout4 is sufficiently large as compared to a capacitance of each of the intermediate capacitors C1 to C4, as with the above example using the configuration illustrated in FIG. 7, the Kirchhoff's second law is applied to each of a current pathway illustrated in FIG. 13a (mode 1), and a current pathway illustrated in FIG. 13b (mode 2), to obtain the following formula groups (6) and (7) (reference signs used in the formula groups (6) and (7), such as reference signs for voltages across respective elements, are the same as those in the formula groups (1) to (4)).

$$E/N - V_{Cout3} - V_{Cout2} - V_{Cout1} - V_{C1a} = 0$$

$$E/N - V_{Cout3} - V_{Cout2} - V_{C2a} = 0$$

$$E/N - V_{Cout3} - V_{C3a} = 0$$

$$E/N - V_{C4a} = 0 \quad (6)$$

$$V_{Cout3} + V_{Cout2} + V_{C1b} = 0$$

$$V_{Cout3} + V_{C2b} = 0$$

$$V_{C3b} = 0$$

$$-V_{Cout4} + V_{C4b} = 0 \quad (7)$$

The aforementioned formula group (3) can be obtained from the formula groups (6) and (7). Thus, an operation of the multi-stage voltage doubler rectifier circuit in the configuration illustrated in FIG. 12 can also be described using the equivalent circuit illustrated in FIG. 10.

Second Embodiment

A resonance circuit may also be used as the input circuit. As one example, FIG. 14 illustrates a circuit diagram of a configuration in which a series resonance circuit is used as the input circuit, and connected to the multi-stage voltage doubler rectifier circuit.

The series resonance tank is composed of a resonance inductor Lr and a resonance capacitor Cr, and a transformer and the subsequent circuit are the same as those illustrated in FIG. 7. A rectangular waveform voltage $V_{SN}$ generated at a switching node in a converter is applied between terminals A, B, so that a sine wave-shaped AC (alternate current) voltage is input into the multi-stage voltage doubler rectifier circuit.

Figure 14:
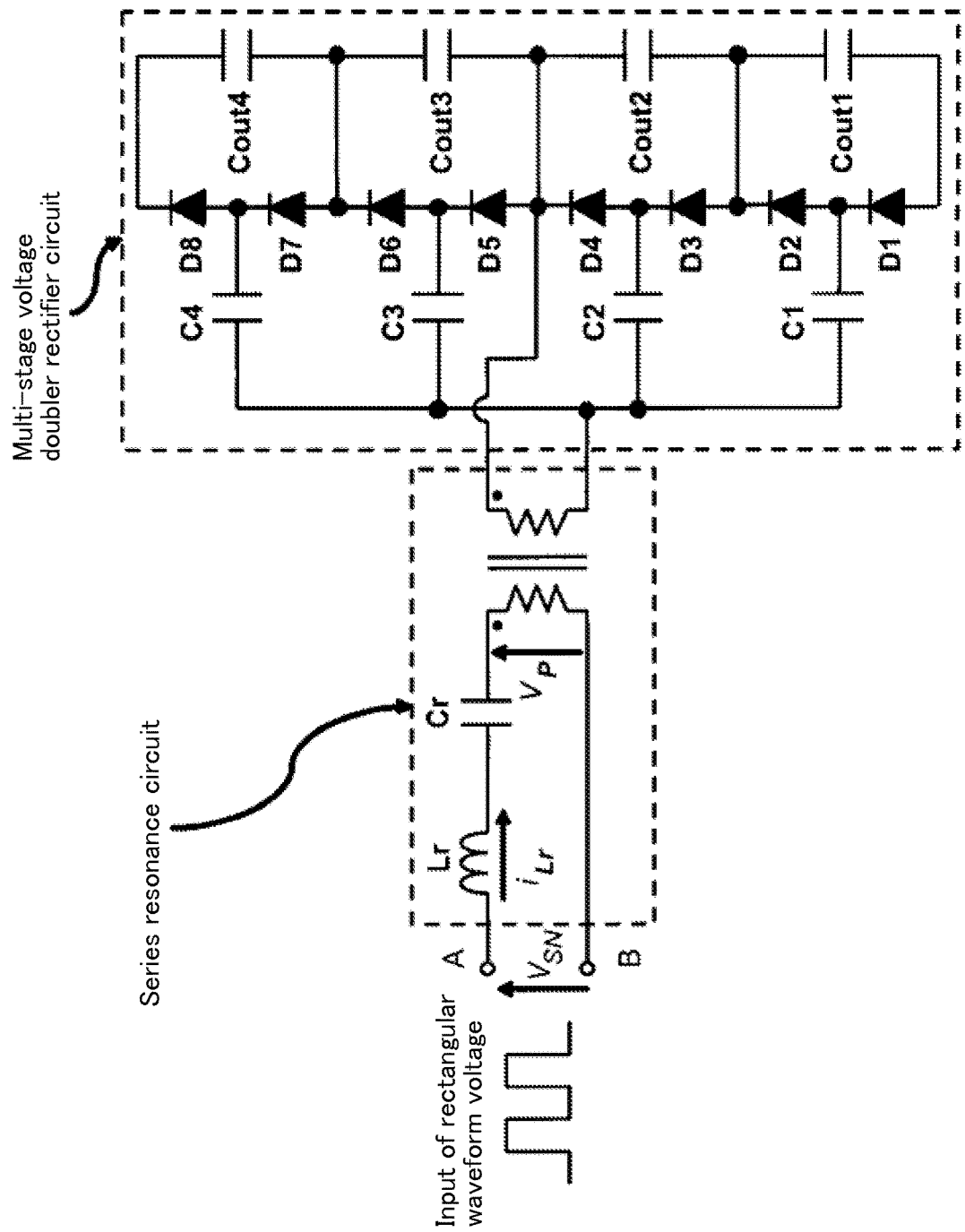
FIG. 14 is a circuit diagram illustrating the multi-stage voltage doubler rectifier circuit, and another example of the input circuit, wherein a series resonance circuit is used as the input circuit.
Figure 15:
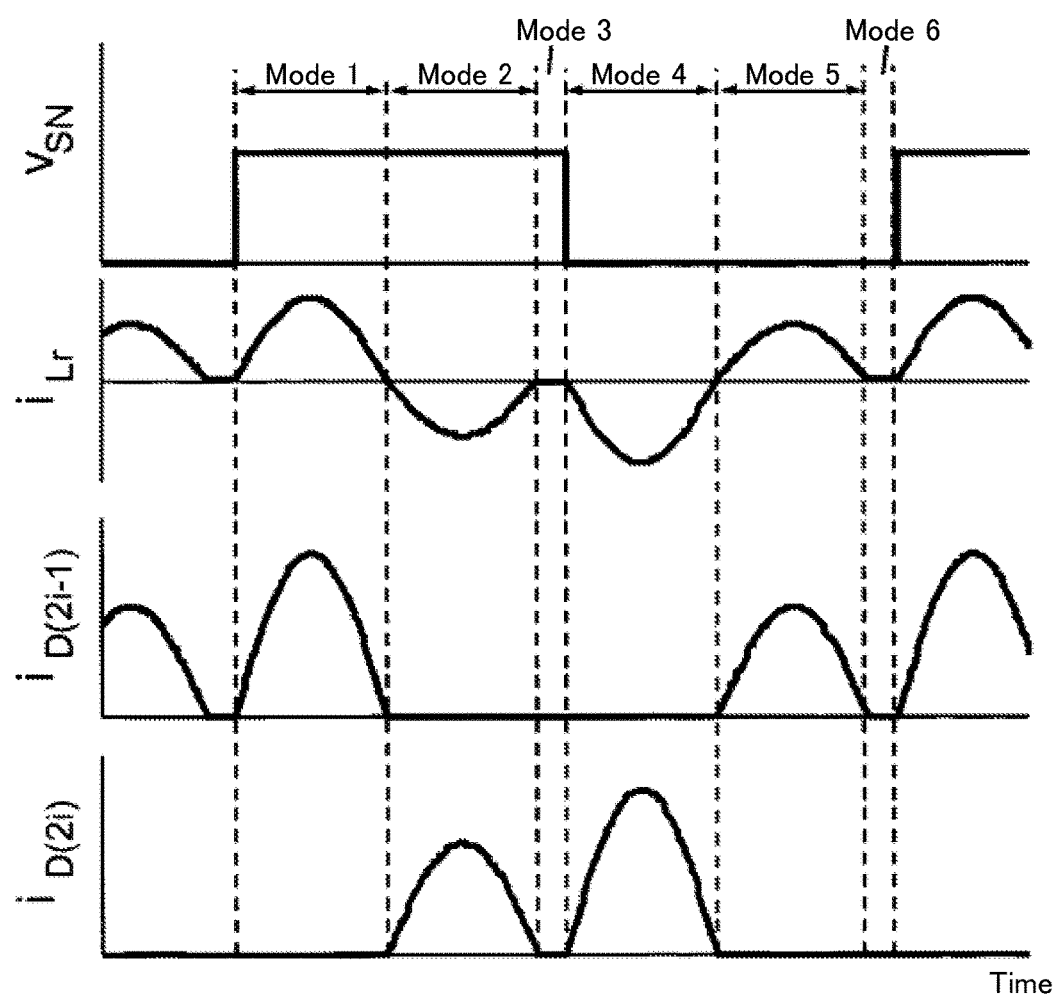
FIG. 15 is a graph presenting operating waveforms in the multi-stage voltage doubler rectifier circuit and the input circuit illustrated in FIG. 14, in a DCM (Discontinuous Conduction Mode).

FIG. 15 presents operating waveforms generated when the circuit illustrated in FIG. 14 is operated in a DCM (Discontinuous Conduction Mode). $i_{Lr}$ represents a current flowing through the resonance inductor Lr (a current flowing in a direction indicated by the arrowed line in FIG. 14 is defined as positive), and $i_{D(2i-1)}$ and $i_{D(2i)}$ represent, respectively, a forward current flowing through each of a group of odd-numbered diodes D1, D3, D5, D7, and a forward current flowing through each of a group of the even-numbered diodes D2, D4, D6, D8.

When the rectangular waveform voltage $V_{SN}$ changes to positive (when the terminal A side in FIG. 14 has a high potential), a positive current $i_{Lr}$ starts to flow through the resonance inductor Lr (mode 1 in FIG. 15). The waveform of the current $i_{Lr}$ changes in a sine wave-like shape due to a resonance phenomenon caused by the resonance inductor Lr and the resonance capacitor Cr, and will decline and eventually become negative (mode 2). The current $i_{Lr}$ reaches a local minimum value, and then re-rises to zero. According to inventors' researches, the current $i_{Lr}$ will subsequently keep a constant value of zero (mode 3). If the rectangular waveform voltage $V_{SN}$ is switched to negative at this timing, a negative current $i_{Lr}$ starts to flow through the resonance inductor Lr (mode 4). Due to the resonance phenomenon caused by the resonance inductor Lr and the resonance capacitor Cr, the current $i_{Lr}$ changes in a sine wave-like waveform, and will rise and eventually become positive (mode 5). The current $i_{Lr}$ reaches a local maximum value, and then re-decline to zero. According to inventors' researches, the current $i_{Lr}$ will subsequently keep a constant value of zero (mode 6). When the current $i_{Lr}$ is positive, a current flows along a pathway illustrated in FIG. 16a, in the multi-stage voltage doubler rectifier circuit. On the other hand, when the current $i_{Lr}$ is negative, a current flows along a pathway illustrated in FIG. 16b, in the multi-stage voltage doubler rectifier circuit. Corresponding to the fact that the current $i_{Lr}$ changes in a sine wave-like waveform, a current flowing through each of the diodes in the multi-stage voltage doubler rectifier circuit also changes in a sine wave-like waveform (FIG. 15).

Figure 16A:
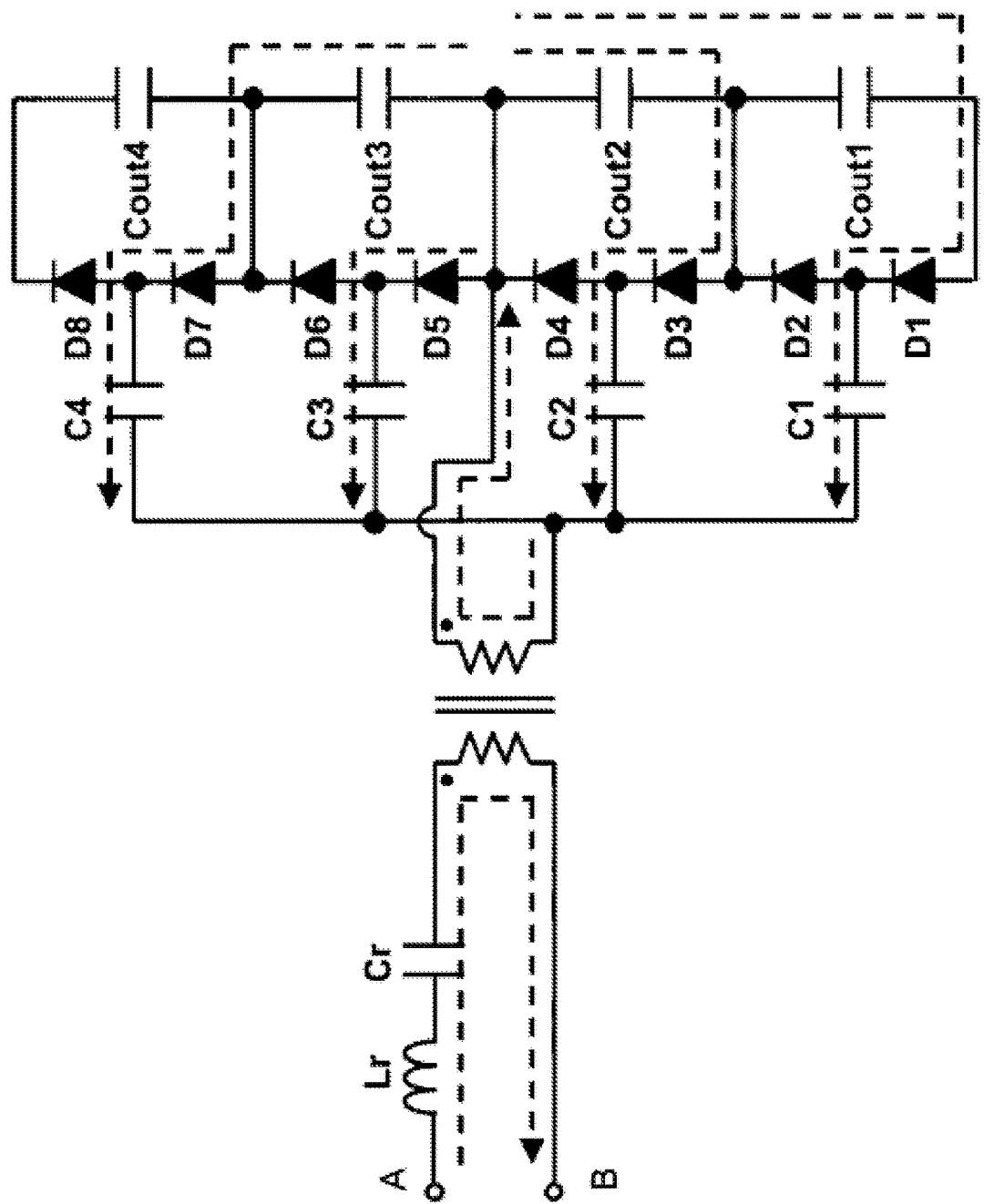
FIG. 16a is a diagram illustrating a current pathway in modes 1 and 5, during operations of the multi-stage voltage doubler rectifier circuit and the input circuit illustrated in FIG. 14.
Figure 16B:
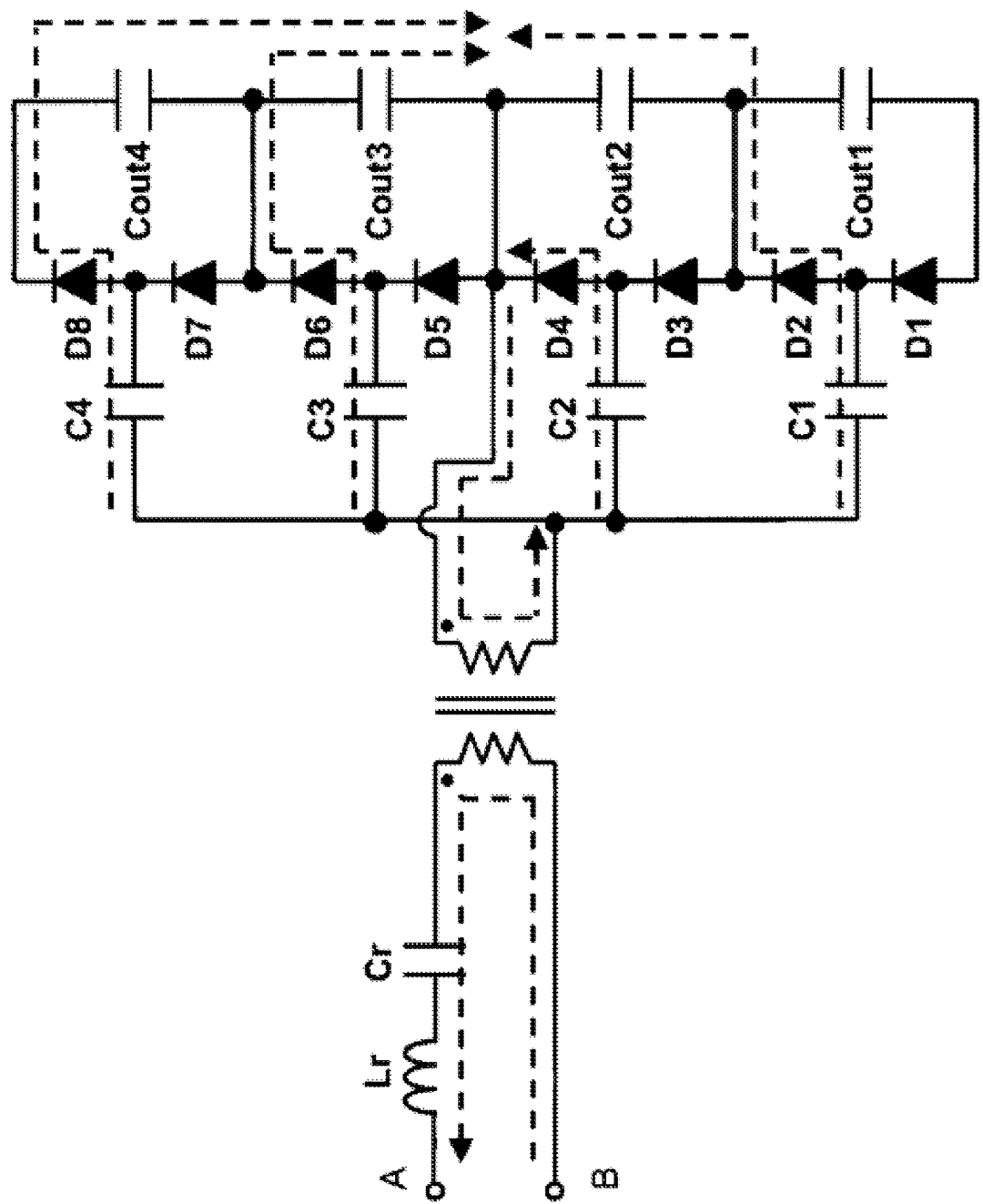
FIG. 16b is a diagram illustrating a current pathway in modes 2 and 4, during operations of the multi-stage voltage doubler rectifier circuit and the input circuit illustrated in FIG. 14.

As above, the multi-stage voltage doubler rectifier circuit in FIG. 14 operates while taking two pathways illustrated in FIGS. 16a and 16b, depending on a polarity of the current $i_{Lr}$ flowing through the resonance inductor Lr. When the current pathway illustrated in FIG. 16a is established (when the current $i_{Lr}$ is positive; corresponding to the mode 1 and the mode 5 in FIG. 15), the odd-numbered diodes D(2i−1) (i=1, - - - , 4) in the multi-stage voltage doubler rectifier circuit are conducted. On the other hand, when the current $i_{Lr}$ is negative (corresponding to the mode 2 and the mode 4 in FIG. 15), the even-numbered diodes D(2i) in the multi-stage voltage doubler rectifier circuit are conducted. In the mode 3 and the mode 6, no current flows through the circuit. In order to realize an operation in DCM (allow respective time periods of the mode 3 and the mode 6 to exist), it is necessary to determine a switching frequency or a circuit constant in such a manner that a time period of each of a high level and a low level of the voltage $V_{SN}$ to be applied to the series resonance circuit becomes longer than a resonance period of the series resonance circuit.

When the series resonance circuit operates in DCM, the current $i_{Lr}$ flowing through the resonance inductor Lr in each mode can be expressed as the following formula (8) using time t as a function.

$$i_{Lr}(t) = \begin{cases} \dfrac{|V_{SN}|/2 + V_P}{Z_0}\sin\omega_0 t & \text{(Mode 1)} \\ \dfrac{-|V_{SN}|/2 + V_P}{Z_0}\sin\omega_0 t & \text{(Mode 2)} \\ -\left(\dfrac{|V_{SN}|/2 + V_P}{Z_0}\right)\sin\omega_0 t & \text{(Mode 4)} \\ -\left(\dfrac{-|V_{SN}|/2 + V_P}{Z_0}\right)\sin\omega_0 t & \text{(Mode 5)} \end{cases} \quad (8)$$

In the formula (8), $|V_{SN}|$ represents a voltage amplitude of the rectangular waveform input voltage; $V_P$ represents a voltage to be applied to a first coil (FIG. 14); $Z_0$ represents a characteristic impedance of the resonance circuit ($Z_0$=(Lr/Cr)$^{0.5}$), where Lr is an inductance of the resonance inductor, and Cr is a capacitance of the resonance capacitor); and $\omega_0$ is a resonance angular frequency ($\omega_0$=2πfr, where fr is a frequency of the series resonance circuit).

An operation in the mode 1 to the mode 2 and an operation in the mode 4 to the mode 5 are symmetrical operations. Thus, an average current absolute value of the current $i_{Lr}$ is derived by integrating absolute values of the currents $i_{Lr}$ represented in the mode 1 and the mode 2 in the formula (8), over a half cycle $T_s/2$, i.e., calculated by the following formula (9).

$$|i_{Lr}| = \dfrac{1}{\frac{T_S}{2}}\int_0^{\frac{T_S}{2}}|i_{Lr}(t)|\,dt = \dfrac{2f_S V_{SN}}{\pi f_r Z_0} \quad (9)$$

In the formula (9), fs represents a switching frequency of the rectangular waveform voltage $V_{SN}$. As above, in the DCM operation, a current in the circuit can be set to an arbitrary value or less by appropriately setting the switching frequency fs or the circuit constant $Z_0$, without using a circuit for current limiting, or feedback control.

As previously mentioned, in order to allow the series resonance circuit to operate in DCM, a time period of each of a high level and a low level of the voltage $V_{SN}$ needs to become longer than a resonance period of the resonance circuit. That is, it is necessary to satisfy the following inequality group.

$$f_r > \dfrac{f_S}{D_{min}} \quad (10)$$

$$f_r > \frac{f_s}{(1-D_{min})}$$

In the equality group (10), $D_{min}$, represents a minimum time ratio during operation of the SEPIC converter. In the converter, although the time ratio D varies according to a ratio between input and output voltages, as shown by the formula (5), as long as the inequality group (10) is satisfied, it is possible to prevent excessive current from flowing through the series resonance circuit and the multi-stage voltage doubler rectifier circuit, so that the charge device can safely operate.

On the other hand, in other types of resonance circuits, an operating characteristic is largely influenced by variation in time ratio, so that there is a need for some current limiting function or circuit. The same applies to a resonance converter using frequency control instead of time ratio control.

Figure 17:
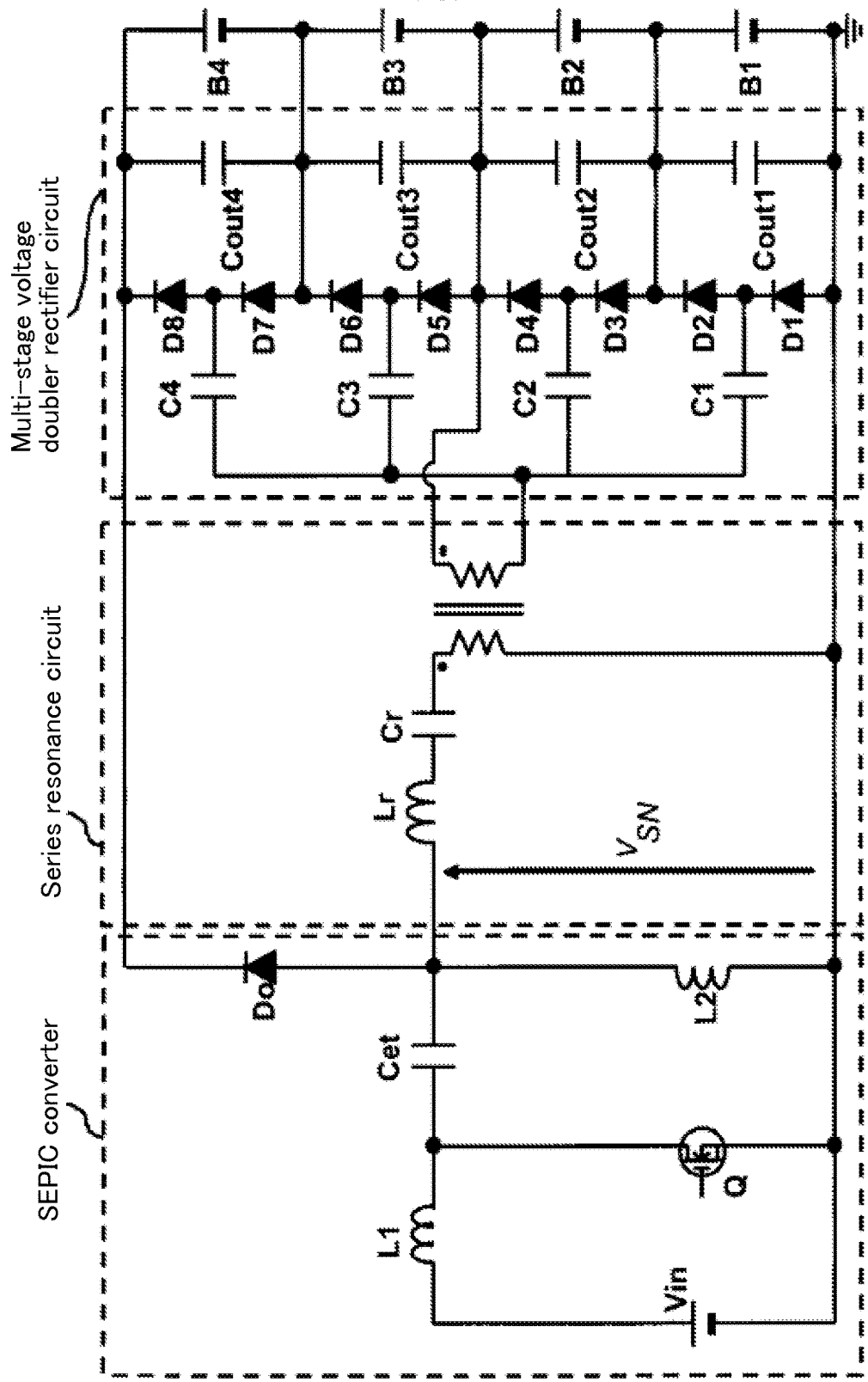
FIG. 17 is a circuit diagram of a system in which the series-connected electricity storage cells B1 to B4 are connected to an equalization function-equipped charge device comprising a SEPIC converter, an input circuit (series resonance circuit) and a multi-stage voltage doubler rectifier circuit, according to a second embodiment of the present invention.

FIG. 17 illustrates a circuit diagram of an equalization function-equipped charging system in which four series-connected electricity storage cells group B1 to B4 are connected to a charge device according to a second embodiment of the present invention, wherein in the charge device, the SEPIC converter illustrated in FIG. 4d, and the input circuit and the multi-stage voltage doubler rectifier circuit illustrated in FIG. 14 are connected. As previously mentioned, when the rectangular waveform voltage is input into the input circuit, a current flows along each of the pathways illustrated in FIGS. 16a and 16b, in the multi-stage voltage doubler rectifier circuit. Thus, in a qualitative aspect, the similar equalization operation as that described using the formula groups (1) to (4) is performed to thereby equalize voltages across the electricity storage cells group B1 to B4. In addition, an output voltage of the SEPIC converter is applied to the electricity storage cells group B1 to B4 to thereby charge the electricity storage cells. Further, a current limiting function based on the DCM operation of the series resonance circuit may be utilized to eliminate a need for an additional current limiting function or circuit.

Although FIG. 17 describes a configuration in which a switching node composed of a connection point of a capacitor Cet, a diode Do and an inductor L2 in the SEPIC converter is connected to the multi-stage voltage doubler rectifier circuit, another switching node, i.e., a switching node composed of a connection point of the capacitor Cet, a switch Q and an inductor L1, may be connected to the multi-stage voltage doubler rectifier circuit. In this case, it is possible to obtain a similar equalization function. The voltage equalization function-equipped charge device of the present invention may be constructed using converters other than the SEPIC converter. In the above, the series resonance type multi-stage voltage doubler rectifier circuit is shown, but any other suitable resonance scheme may be employed.

Figure 18:
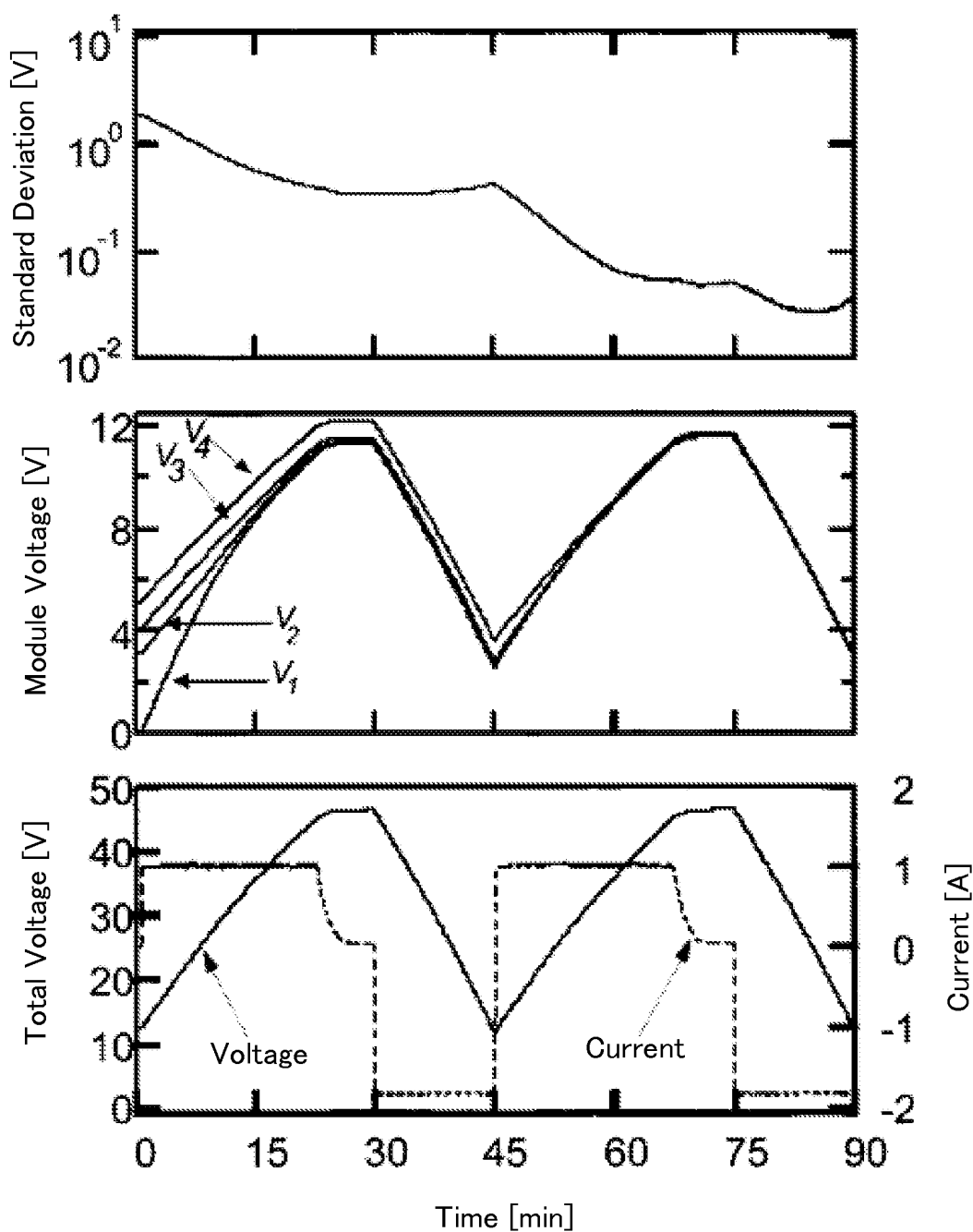
FIG. 18 is graphs presenting a result of an experiment on an equalization function-equipped charge device (a SEPIC converter, a series resonance circuit and a multi-stage voltage doubler rectifier circuit are used in the equalization function-equipped charge device) according to the present invention.

FIG. 18 presents a result of an experiment using an equalization function-equipped charge device (charging electric power: 50 W) according to the present invention. In the experiment, four electric double layer capacitor modules each having an electrostatic capacitance of 220 F were connected in series, and they were subjected to a charging-discharging cycle using the charge device illustrated in FIG. 17 according to the present invention, for charging, and an electronic load (constant current: 1.8 A) for discharging. Parameters of each element used in the charge device were set as follows. First of all, as regards the SEPIC converter, an inductance of each of the inductors L1, L2: 100 µH, a capacitance of the capacitor Cet: 20 µF, an ON resistance of an N-Ch MOSFET switch Q: 150 mΩ, and a forward voltage drop of a schottky diode Do: 0.67 V. As regards the multi-stage voltage doubler rectifier circuit, a capacitance of each of intermediate capacitors C1 to C4: 33 µF, a capacitance of each of capacitors Cout1 to Cout4: 66 µF, and a forward voltage drop of each of schottky diodes D1 to D8: 0.43 V. As regards the input circuit, an inductance of the resonance inductor Lr: 15.2 µH, a capacitance of the resonance capacitor Cr: 10 nF, the number of turn ratio of the first coil:a second coil=39:6, and a mutual inductance: 3.09 mH. The experiment was started under the condition that initial voltages of the electric double layer capacitors were non-uniform. During charging, a standard deviation of an electric double layer capacitor module voltage is gradually reduced by the equalization function of the charge device according the present invention (graph with a scale "Standard Deviation", in FIG. 18). This shows that voltage variation starts to be eliminated. On the other hand, during discharging, the constant-current electronic load is used for discharging. Thus, it is shown that there is not a large change in the standard deviation, and there is no change in the state of voltage variation. The standard deviation is reduced to about 30 mV at a time of completion of two cycles. This has shown that the voltage variation can be eliminated by the equalization function-equipped charge device according to the present invention. In FIG. 18, the graph of Module Voltage presents a voltage of each of the electric double layer capacitor modules, and the graph of Total Voltage and Current presents a total voltage and a total current of each of the electric double layer capacitor modules, respectively.

Third Embodiment

The embodiments of the equalization function-equipped charge devices have been described above. The charge devices are constructed using a unidirectional converter configured to transmit electric power in one direction. This charge device of the present invention may be configured using a bidirectional converter so as to allow electric power to be bidirectionally transmitted. By this, an equalization function-equipped charge-discharge device according to the present invention can be obtained. As one example, the charge-discharge device according to the present invention can be obtained by replacing the diode Do in the SEPIC converter comprised in the configuration illustrated in FIG. 17, with a switch, so as to use the converter as a bidirectional SEPIC converter.

Figure 19:
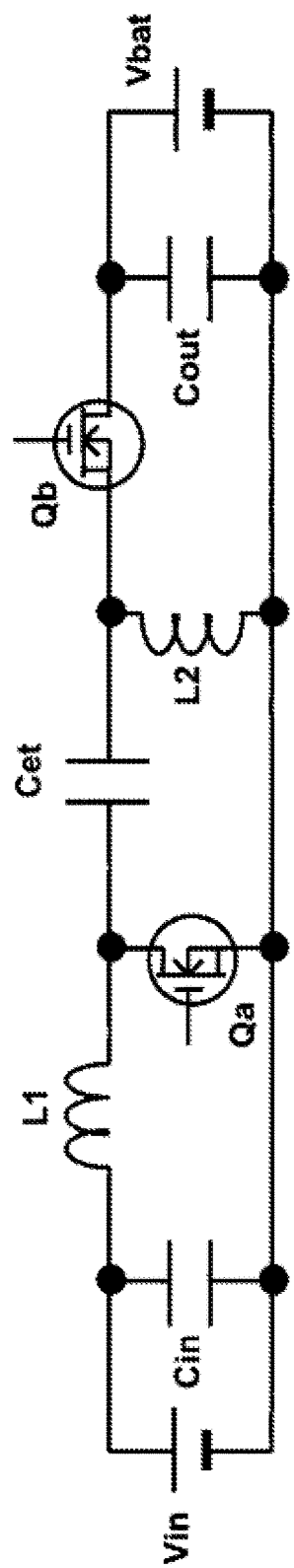
FIG. 19 is a circuit diaphragm of a bidirectional SEPIC converter usable in the charge device and the charge-discharge device of the present invention.

Firstly, with reference to FIGS. 19 to 23b, an operation of the bidirectional SEPIC converter will be described. FIG. 19 is a circuit diaphragm of a bidirectional SEPIC converter obtained by replacing the diode in the SEPIC converter with a switch. A power supply Vbat in FIG. 19 corresponds to the series-connected electricity storage cells B1 to B4 (FIG. 11, FIG. 17). In the case where an output voltage [$V_{in}$×(multiplied by) D/(1−D)] of the SEPIC converter is greater than a voltage of the power supply Vbat, where $V_{in}$ represents a voltage of a power supply Vin, the bidirectional SEPIC converter is operable to charger the power supply Vbat (charging mode). In the case where the output voltage of the SEPIC converter is less than the voltage of the power supply Vbat, the bidirectional SEPIC converter is operable to cause the power supply Vbat to perform a discharging operation (discharging mode).

Figure 20:
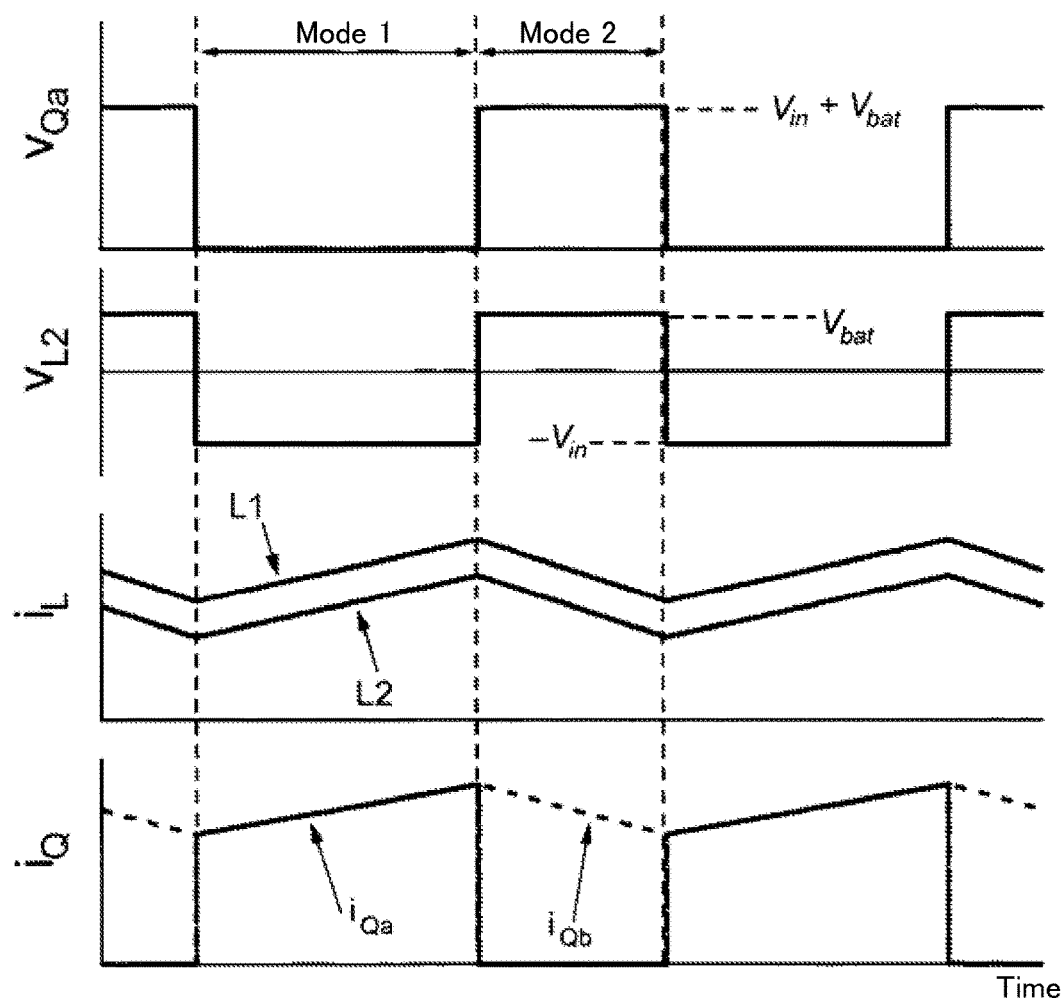
FIG. 20 is a graph presenting operating waveforms in the bidirectional SEPIC converter during charging.
Figure 21A:
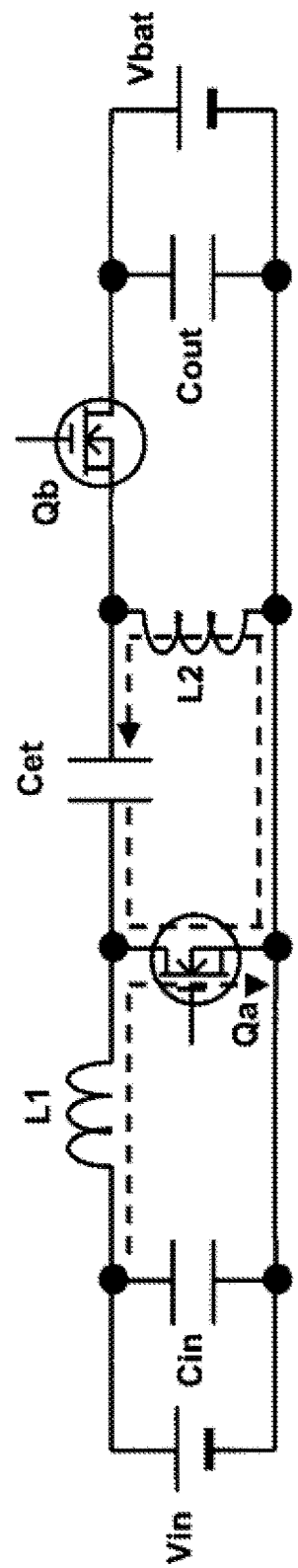
FIG. 21a is a diagram illustrating a current pathway under a condition where a switch Qa is in an ON state, and a switch Qb is in an OFF state, during a charging operation of the bidirectional SEPIC converter.
Figure 21B:
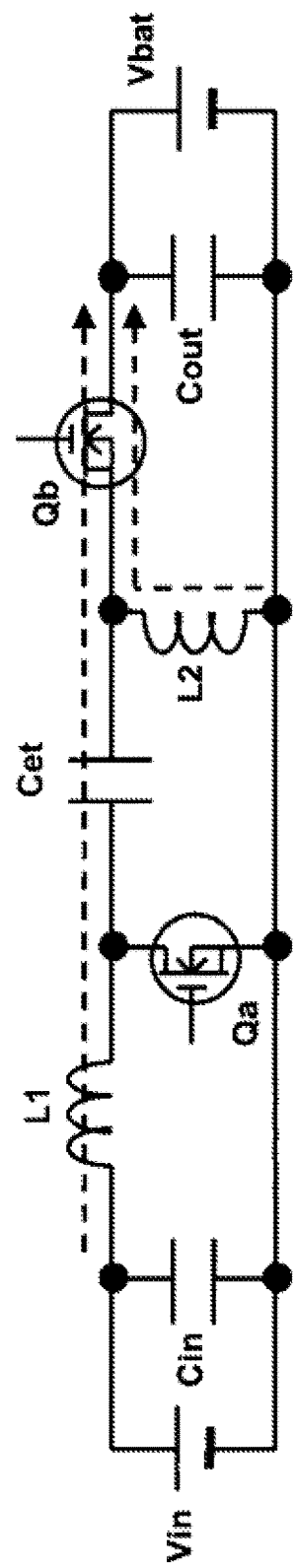
FIG. 21b is a diagram illustrating a current pathway under a condition where the switch Qa is in an OFF state, and the switch Qb is in an ON state, during the charging operation of the bidirectional SEPIC converter.

Current pathways during the charging mode are as illustrated in FIGS. 21a and 21b, which are similar to the current pathways illustrated in FIGS. 6a and 6b. In a mode 1 (FIG. 21a) where a switch Qa is in an ON state, and a switch Qb is in an OFF state, voltages from the power supply Vin and the capacitor Cet are applied, respectively, to the inductor L1 and the inductor L2, so that currents flowing through the respective inductors L1, L2 linearly increase. A voltage applied to the switch Qa in this process is zero (on-resistance is ignored). In a mode 2 (FIG. 21b) where the switch Qa is in an OFF state, and the switch Qb is in an ON state, each of the currents flowing through the inductors L1, L2 flows to the power supply Vbat via the switch Qb. Although an induced electromotive force of the inductor L1 is applied to the switch Qa, no current flows therethrough because the switch Qa is kept in the OFF state. Further, a voltage (having a polarity opposite to that of the voltage applied from the capacitor Cet during the ON time period of the switch Qa) is applied from a capacitor Cout to the inductor L2. As above, along with a switching operation, each of a voltage $V_{Qa}$ of the switch Qa and a voltage $V_{L2}$ of the inductor L2 is formed as a rectangular waveform voltage (FIG. 20). Thus, the above elements can be connected to the multi-stage voltage doubler rectifier circuit via the input circuit, thereby making it possible to perform an operation for equalizing voltages across the respective electricity storage cells.

Figure 22:
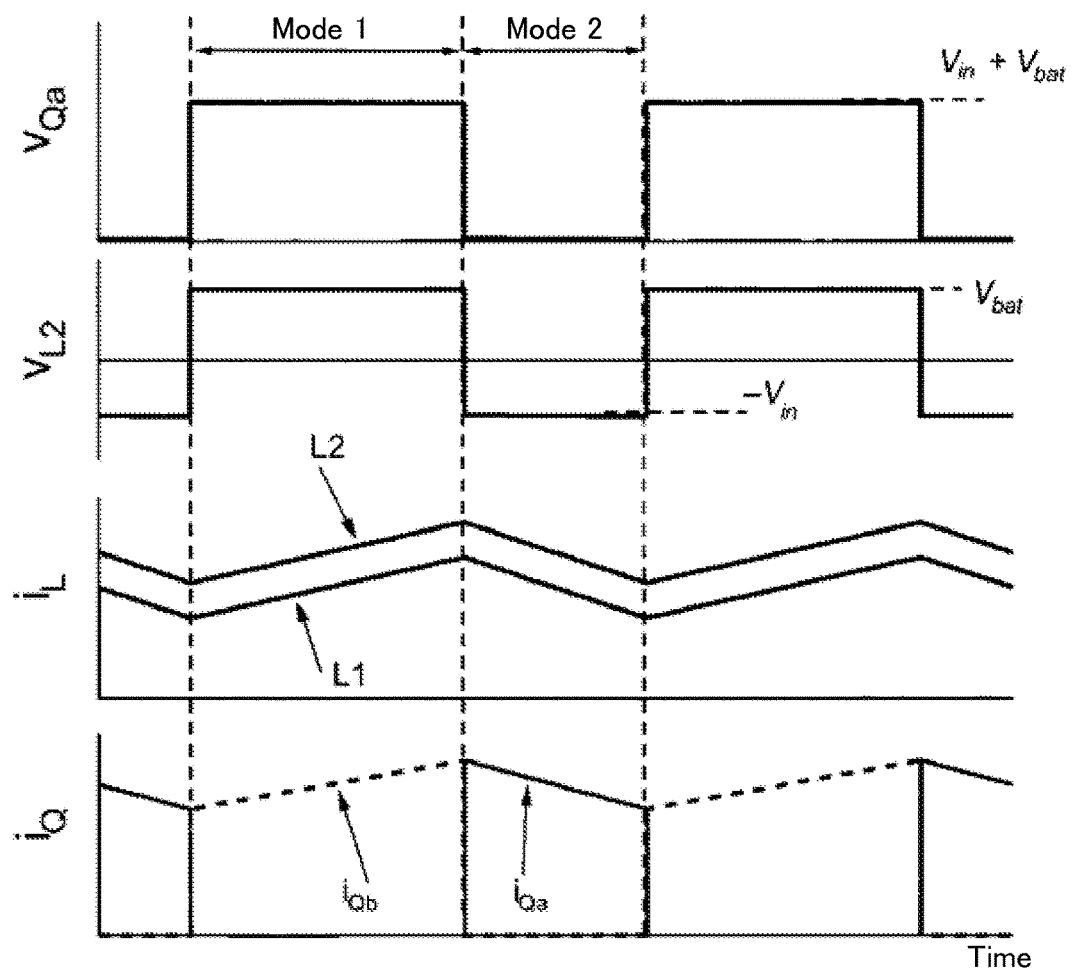
FIG. 22 is a graph presenting operating waveforms in the bidirectional SEPIC converter during discharging.
Figure 23A:
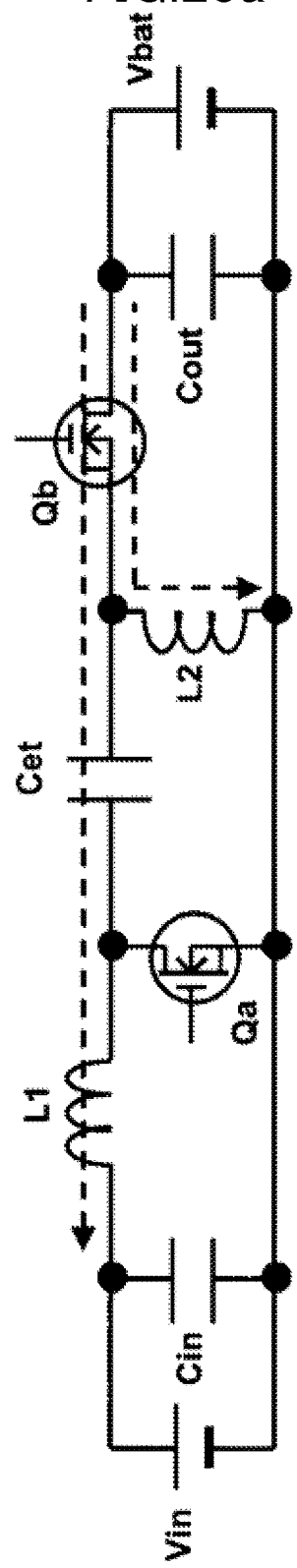
FIG. 23a is a diagram illustrating a current pathway under a condition where the switch Qa is in the OFF state, and the switch Qb is in the ON state, during a discharging operation of the bidirectional SEPIC converter.
Figure 23B:
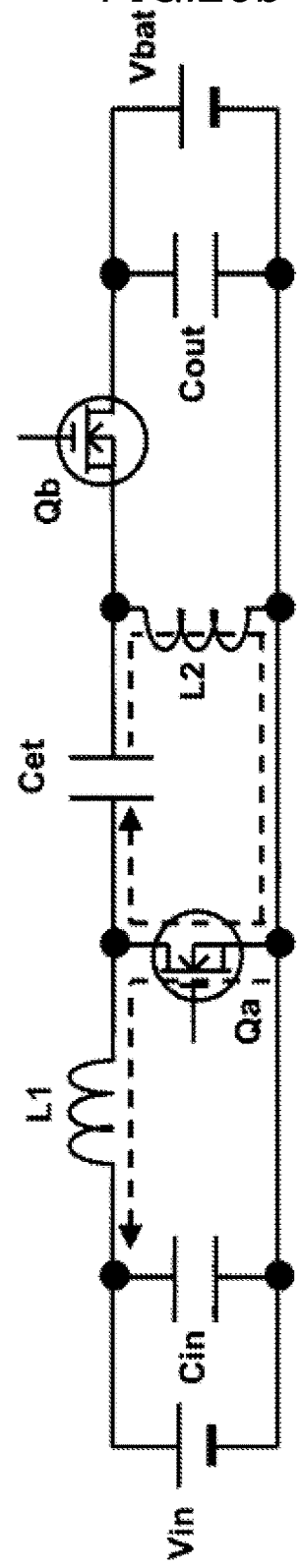
FIG. 23b is a diagram illustrating a current pathway under a condition where the switch Qa is in the ON state, and the switch Qb is in the OFF state, during the discharging operation of the bidirectional SEPIC converter.

FIG. 22 presents voltages and currents at the respective elements during the discharge mode, and FIGS. 23a and 23b illustrate current pathways during the discharge mode. In a mode 1 (FIG. 23a) where the switch Qa is in the OFF state, and the switch Qb is in the ON state, a voltage of the power supply Vbat and a total voltage of the power supply Vbat and the capacitor Cet are applied, respectively, to the inductor L2 and the inductor L1, so that currents flowing through the respective inductors L1, L2 linearly increase. Although an induced electromotive force of the inductor L1 is applied to the switch Qa, no current flows therethrough because the switch Qa is kept in the OFF state. In a mode 2 (FIG. 23b) where the switch Qa is in the ON state, and the switch Qb is in the OFF state, each of the currents flowing through the inductors L1, L2 flows through the switch Qa. A voltage applied to the switch Qa in this process is zero, and a voltage having a polarity opposite to that of the voltage applied from the power supply Vbat in the mode 1 is applied from the capacitor Cet to the inductor L2. As above, along with a switching operation, each of the voltage $V_{Qa}$ of the switch Qa and the voltage $V_{L2}$ of the inductor L2 is formed as a rectangular waveform voltage. Throughout the both time periods, only a current flowing through the inductor L1 flows toward the power supply Vin. As above, along with a switching operation, each of the voltage $V_{Qa}$ of the switch Qa and the voltage $V_{L2}$ of the inductor L2 is formed as a rectangular waveform voltage (FIG. 22). Thus, the above elements can be connected to the multi-stage voltage doubler rectifier circuit via the input circuit, thereby making it possible to perform an operation for equalizing voltages across the respective electricity storage cells.

Figure 24:
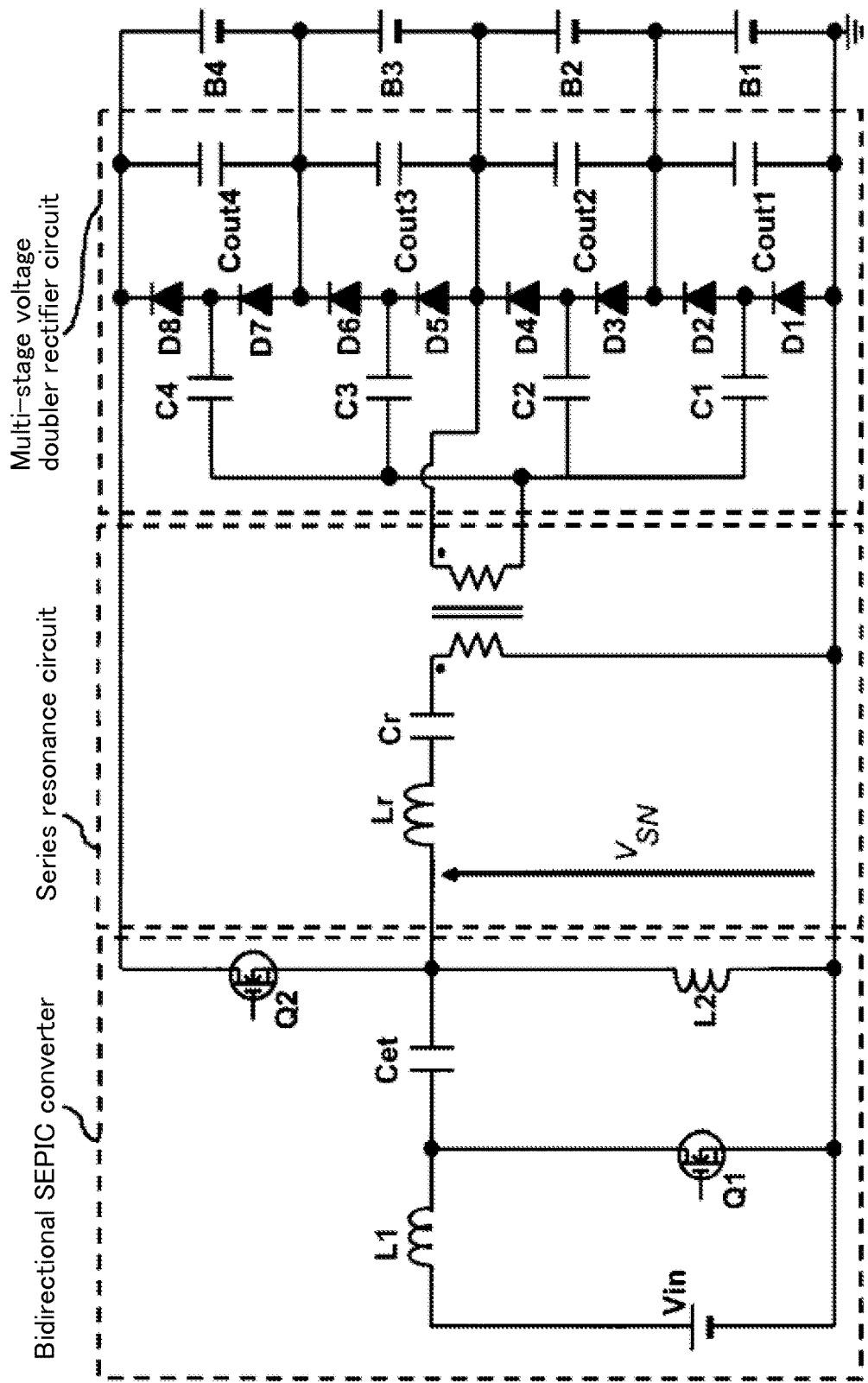
FIG. 24 is a circuit diagram of a system in which the series-connected electricity storage cells B1 to B4 are connected to an equalization function-equipped charge device comprising a bidirectional SEPIC converter, an input circuit (series resonance circuit) and a multi-stage voltage doubler rectifier circuit, according to a third embodiment of the present invention.

FIG. 24 is a circuit diagram of a charge-discharge system in which a charge-discharge device according to the present invention is connected to the series-connected electricity storage cells B1 to B4, wherein the charge-discharge device configured such that the bidirectional SEPIC converter illustrated in FIG. 19 is connected to the multi-stage voltage doubler rectifier circuit via the input circuit (series resonance circuit). As with the system illustrated in FIG. 17, when the rectangular waveform voltage is input into the input circuit, a current flows along each of the pathways illustrated in FIGS. 16a and 16b, in the multi-stage voltage doubler rectifier circuit. Thus, in a qualitative aspect, the same equalization operation as that described using the formula groups (1) to (4) is performed to thereby equalize voltages across the respective electricity storage cells group B1 to B4. In addition, an output voltage of the bidirectional SEPIC converter is applied to the electricity storage cells group B1 to B4 to thereby charge and discharge the electricity storage cells. Further, as with the system illustrated in FIG. 17, a current limiting function based on the DCM operation of the series resonance circuit may be utilized to eliminate a need for an additional current limiting function or circuit (However, in this configuration, it is not necessary to use the series resonance circuit. For example, the input circuit illustrated in FIG. 11 may be used. Alternatively, the bidirectional converter and the multi-stage voltage doubler rectifier circuit may be simply connected by a conductive wire without using a transformer, as in an aftermentioned fourth embodiment).

Fourth Embodiment

In the above embodiments, a circuit comprising a transformer is used as the input circuit, and a voltage for equalizing voltages across the respective electricity storage cells is input into the multi-stage voltage doubler rectifier circuit. However, the use of a transformer is not necessary for the present invention. For example, the multi-stage voltage doubler rectifier circuit may be connected to both ends of the inductor L2 in the SEPIC converter illustrated in FIG. 4d or FIG. 19 via a conductive wire (serving as an "input circuit" in this embodiment). In this case, the rectangular waveform voltage is input from the inductor L2 into the multi-stage voltage doubler input circuit, and a current flows along similar current pathways as those in FIGS. 9a and 9b. That is, the same equalization operation as that described using the formula groups (1) to (4) is performed to thereby equalize voltages across the respective electricity storage cells group B1 to B4. In addition, the electricity storage cells B1 to B4 are charged or discharged by an output voltage of the converter. Therefore, a charge device and charge-discharge device according to the present invention can operate also in this embodiment.

It should be noted, also in this case, that a position of the multi-stage voltage doubler rectifier circuit to which a voltage for the equalization is input from the input circuit may be arbitrarily set. For example, in a multi-stage voltage doubler rectifier circuit illustrated in FIG. 25, when the rectangular waveform voltage $V_{SN}$ from an element in a converter is input between terminals A, B as shown in that Figure, a current pathway flowing through the multi-stage voltage doubler rectifier circuit are switched between pathways illustrated in FIG. 26a (mode 1) and FIG. 26b (mode 2). On the assumption that each reference sign is defined in the same manner as that in the formula groups (1) to (4), according to the Kirchhoff's second law, the following formula group is satisfied in the mode 1.

$$E - V_{Cout1} - V_{C1a} = 0$$

$$E - V_{Cout2} - V_{Cout1} - V_{C2a} = 0$$

$$E - V_{Cout3} - V_{Cout2} - V_{Cout1} - V_{C3a} = 0$$

$$E - V_{Cout4} - V_{Cout3} - V_{Cout2} - V_{Cout1} - V_{C4a} = 0 \qquad (11)$$

Further, the following formula group is satisfied in the mode 2 (wherein a waveform of the rectangular waveform voltage $V_{SN}$ is set to that illustrated in FIG. 8, and polarities of $V_{C1a}$ to $V_{C4a}$ and $V_{C1b}$ to $V_{C4b}$ are defined to be reverse to those at the time when deriving the formula groups (1) to (4)).

$$V_{C1b}=0$$

$$V_{Cout1}+V_{C2b}=0$$

$$V_{Cout1}+V_{Cout2}+V_{C3b}=0$$

$$V_{Cout1}+V_{Cout2}+V_{Cout3}+V_{C4b}=0 \qquad (12)$$

From the formula groups (11) and (12), a voltage variations $\Delta$ (delta) $V_{C1}=V_{C1a}-V_{C1b}$, $\Delta$ (delta) $V_{C2}=V_{C2a}-V_{C2b}$, $\Delta$ (delta) $V_{C3}=V_{C3a}-V_{C3b}$, $\Delta$ (delta) $V_{C4}=V_{C4a}-V_{C4b}$ in the intermediate capacitors C1 to C4 between the mode 1 and the mode 2 are calculated as follows.

$$\Delta V_{C1}=E-V_{Cout1}$$

$$\Delta V_{C2}=E-V_{Cout2}$$

$$\Delta V_{C3}=E-V_{Cout3}$$

$$\Delta V_{C4}=E-V_{Cout4} \qquad (13)$$

Figure 25:
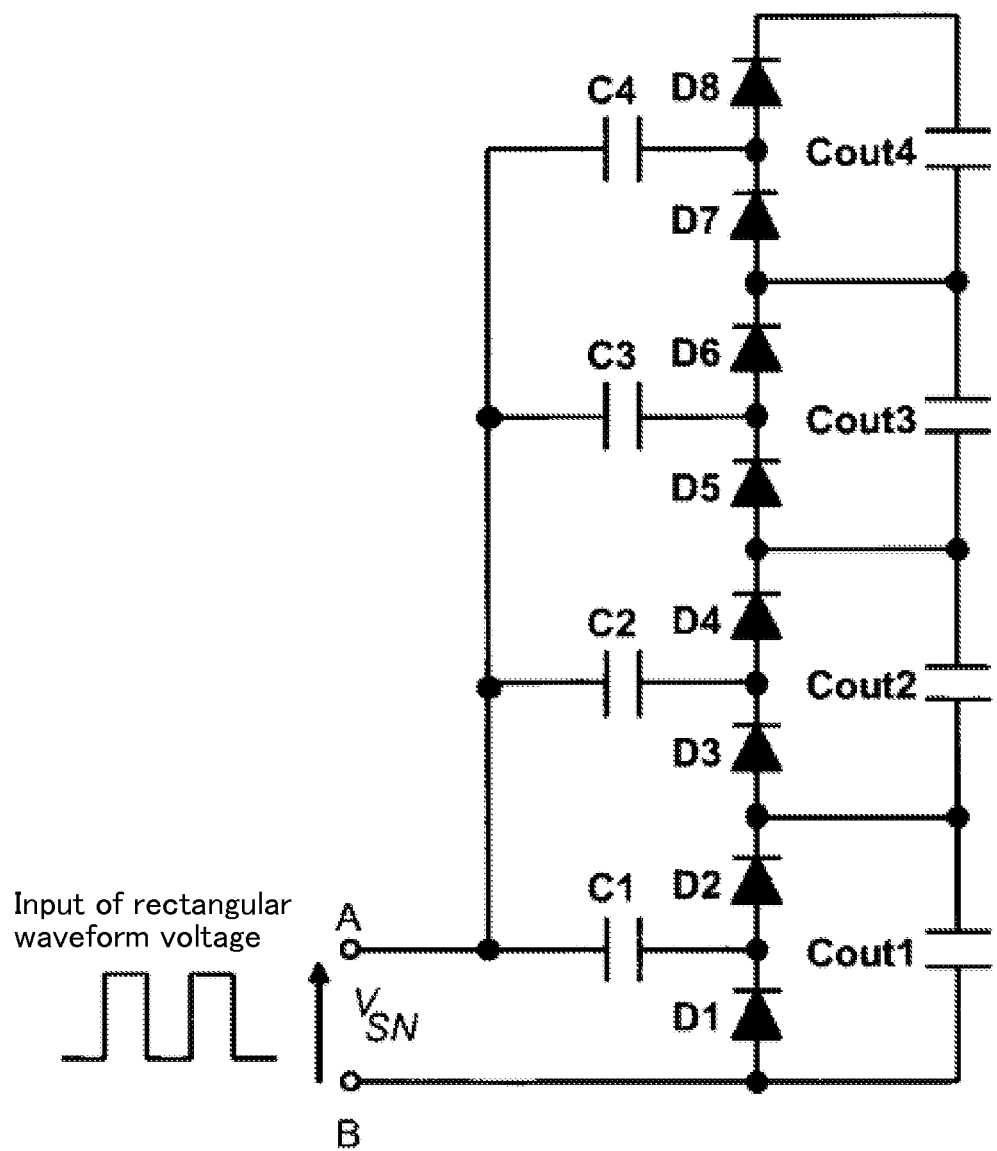
FIG. 25 is a circuit diagram illustrating a configuration in the case where a converter and a multi-stage voltage doubler rectifier circuit are connected without using any coil.
Figure 26A:
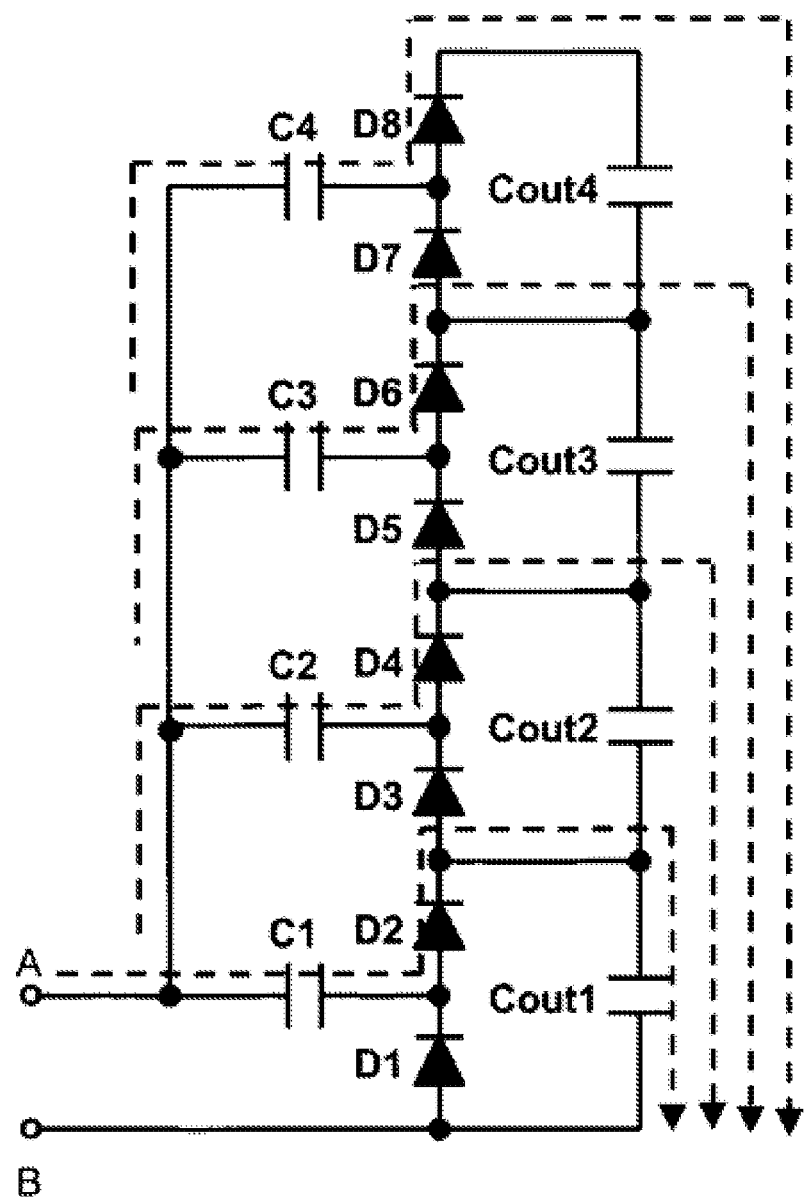
FIG. 26a is a diagram illustrating a current pathway in a mode 1, during operations of the multi-stage voltage doubler rectifier circuit and an input circuit illustrated in FIG. 25.
Figure 26B:
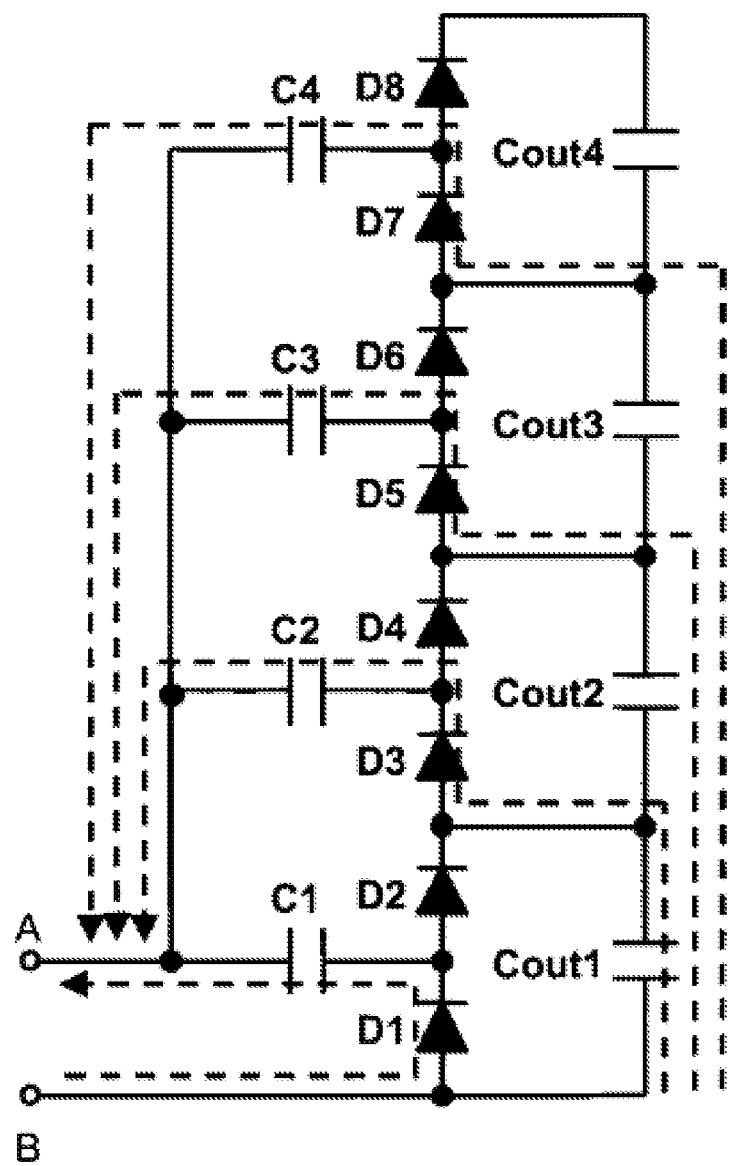
FIG. 26b is a diagram illustrating a current pathway in a mode 2, during operations of the multi-stage voltage doubler rectifier circuit and the input circuit illustrated in FIG. 25.

Thus, an operation of the multi-stage voltage doubler rectifier circuit illustrated in FIG. 25 can also be described using the equivalent circuit illustrated in FIG. 10. Thus, the electricity storage cells group can be equally charged by a charge device configured, for example, such that both ends of the inductor L2 in the SEPIC converter illustrated in FIG. 4d are directly connected, respectively, to the terminals A, B of the multi-stage voltage doubler rectifier circuit illustrated in FIG. 25, using conductive wires, and an output part of the SEPIC converter is connected to both ends of the series-connected capacitors C1 to C4.

INDUSTRIAL APPLICABILITY

A charge device and a charge-discharge device for equally charging electricity storage cells such as secondary batteries or electric double layer capacitors can be configured according to the present invention. The present invention can be widely applied to a power supply using electricity storage cells such as secondary batteries and electric double layer capacitors.

LIST OF REFERENCE SIGNS

B1 to B4: electricity storage cell
Cout1 to Cout4: capacitor
C1 to C4: intermediate capacitor
D1 to D8: diode
Cblock: blocking capacitor
Lr: resonance inductor
Cr: resonance capacitor
Vin, Vbat: power supply
L1, L2: inductor
Q, Qa, Qb: switch
Do: diode
Cet: capacitor

The invention claimed is:

1. A charge device comprising:
a multi-stage voltage doubler rectifier circuit in which two series-connected diodes are connected in parallel, respectively, to each of series-connected 1st to nth capacitors (where n is an integer of 2 or more), and an intermediate capacitor is further connected, respectively, to each intermediate point of the two series-connected diodes;
a converter comprising an element configured to be applied with a rectangular waveform voltage during operation; and
an input circuit operable, in response to receiving an input of a voltage from the element, to output a voltage to the multi-stage voltage doubler rectifier circuit,
wherein the charge device is configured such that the series-connected 1st to nth capacitors are connected to an output part of the converter to thereby charge the 1st to nth capacitors by an output voltage of the converter, and a voltage is input from the element into the multi-stage voltage doubler rectifier circuit via the input circuit to thereby equally charge the 1st to nth capacitors via a different path from the path of the charge of the 1st to nth capacitors by the output voltage of the converter.

2. The charge device as recited in claim 1, wherein the input circuit comprises a first coil connected to the element, and a second coil magnetically coupled to the first coil and connected to the multi-stage voltage doubler rectifier circuit.

3. The charge device as recited in claim 2, wherein a series resonance circuit comprising an inductor and a capacitor connected in series is connected to the first coil.

4. A charge-discharge device comprising:
a multi-stage voltage doubler rectifier circuit in which two series-connected diodes are connected in parallel, respectively, to each of series-connected 1st to nth capacitors (where n is an integer of 2 or more), and an intermediate capacitor is further connected, respectively, to each intermediate point of the two series-connected diodes;
a converter comprising an element configured to be applied with a rectangular waveform voltage during operation wherein the converter is a bidirectional converter; and
an input circuit operable, in response to receiving an input of a voltage from the element, to output a voltage to the multi-stage voltage doubler rectifier circuit,
wherein the charge-discharge device is configured such that the series-connected 1st to nth capacitors are connected to an output part of the converter to thereby charge and discharge the 1st to nth capacitors by an output voltage of the converter, and a voltage is input from the element into the multi-stage voltage doubler rectifier circuit via the input circuit to thereby equally charge the 1st to nth capacitors via a different path from the path of the charge and discharge of the 1st to nth capacitors by the output voltage of the converter.

* * * * *